United States Patent
Kawabe

(10) Patent No.: US 12,272,389 B1
(45) Date of Patent: Apr. 8, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takayuki Kawabe, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/596,334

(22) Filed: Mar. 5, 2024

(30) Foreign Application Priority Data

Dec. 19, 2023 (JP) .................. 2023-213750

(51) Int. Cl.
G11B 5/58 (2006.01)
G11B 5/48 (2006.01)
G11B 5/55 (2006.01)
G11B 5/56 (2006.01)

(52) U.S. Cl.
CPC .......... G11B 5/5547 (2013.01); G11B 5/4886 (2013.01)

(58) Field of Classification Search
CPC .............. G11B 5/5547; G11B 20/1217; G11B 2020/1232; G11B 5/012; G11B 5/09; G11B 5/00; G11B 27/36; G11B 5/58; G11B 5/59633; G11B 5/59638; G11B 5/035; G11B 5/5526; G11B 5/82; G11B 2220/2516; G11B 5/59655; G11B 5/54; G11B 15/4676

See application file for complete search history.

(56) References Cited

U.S. PATENT DOCUMENTS

| | | | |
|---|---|---|---|
| 6,476,992 | B1 | 11/2002 | Shimatani |
| 9,093,091 | B1 | 7/2015 | Chu et al. |
| 9,564,157 | B1 * | 2/2017 | Trantham ........... G11B 5/59627 |
| 2011/0134558 | A1 | 6/2011 | Nakamura et al. |
| 2012/0081810 | A1 | 4/2012 | Kawabe |
| 2019/0362752 | A1 | 11/2019 | Kawabe |
| 2021/0398559 | A1 | 12/2021 | Kawabe et al. |
| 2022/0084549 | A1 | 3/2022 | Kawabe |

FOREIGN PATENT DOCUMENTS

| | | |
|---|---|---|
| JP | 2012-79387 A | 4/2012 |
| JP | 2019-204566 A | 11/2019 |
| JP | 2022-3599 A | 1/2022 |
| JP | 2022-47914 A | 3/2022 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a disk, a read head, and a control unit. The control unit includes a read processing unit that executes first read processing of moving the read head to n1 radial positions within a period in which the disk makes m1 rotations and reading the data of the track, a comparison unit that derives a first signal of highest quality, and a determination unit that determines a radial position at which the first signal of the highest quality is derived as a first appropriate read position. Where $1 \leq m1 < n1$.

20 Claims, 27 Drawing Sheets

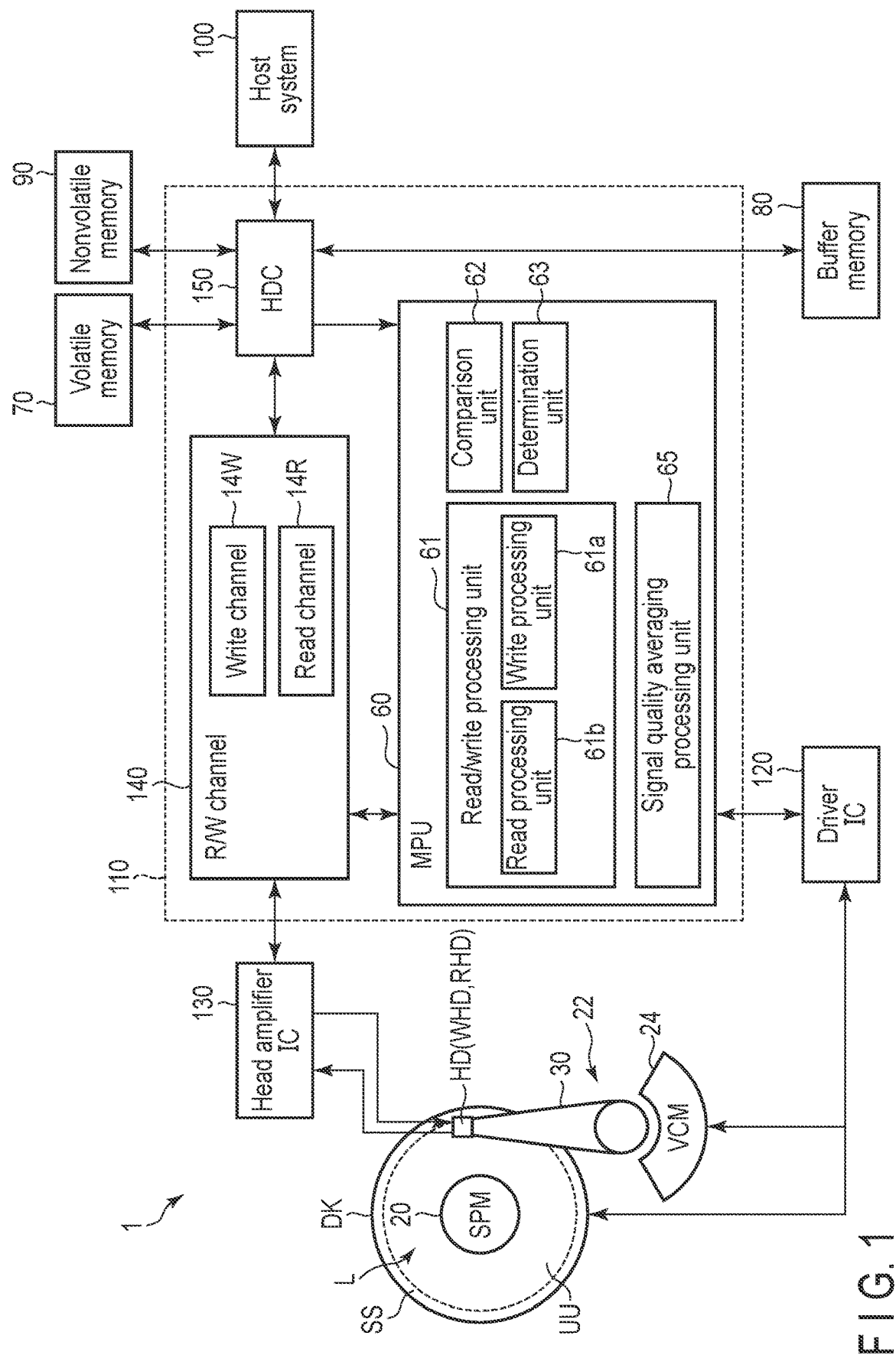
F I G. 1

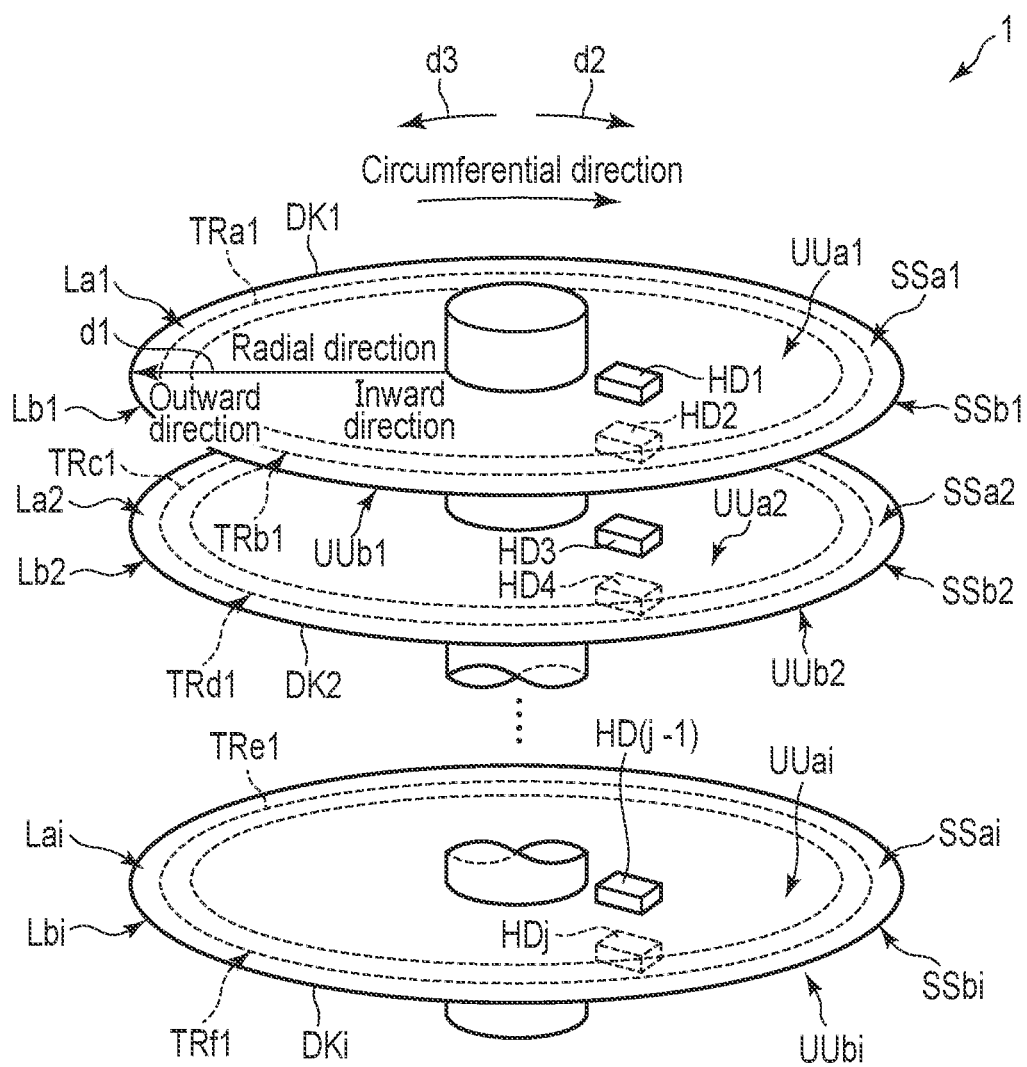
F I G. 2

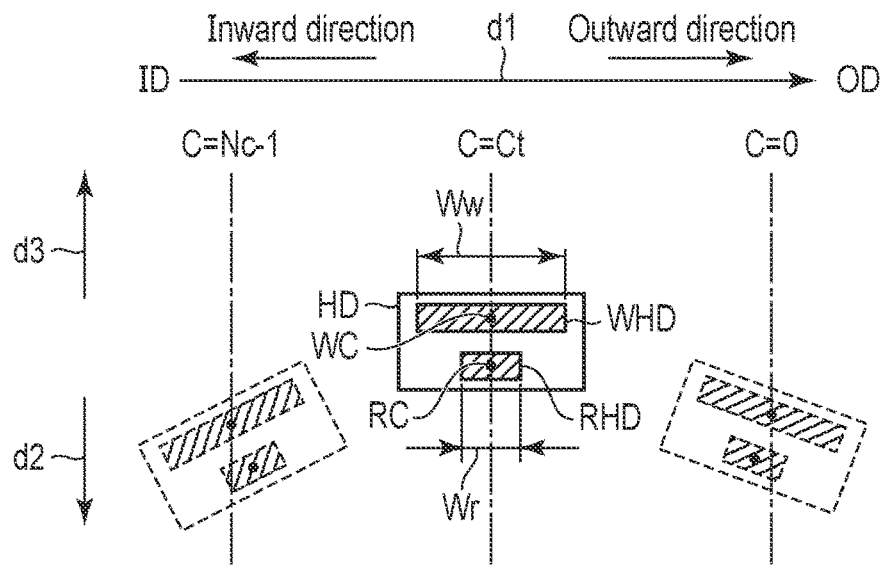
F I G. 5
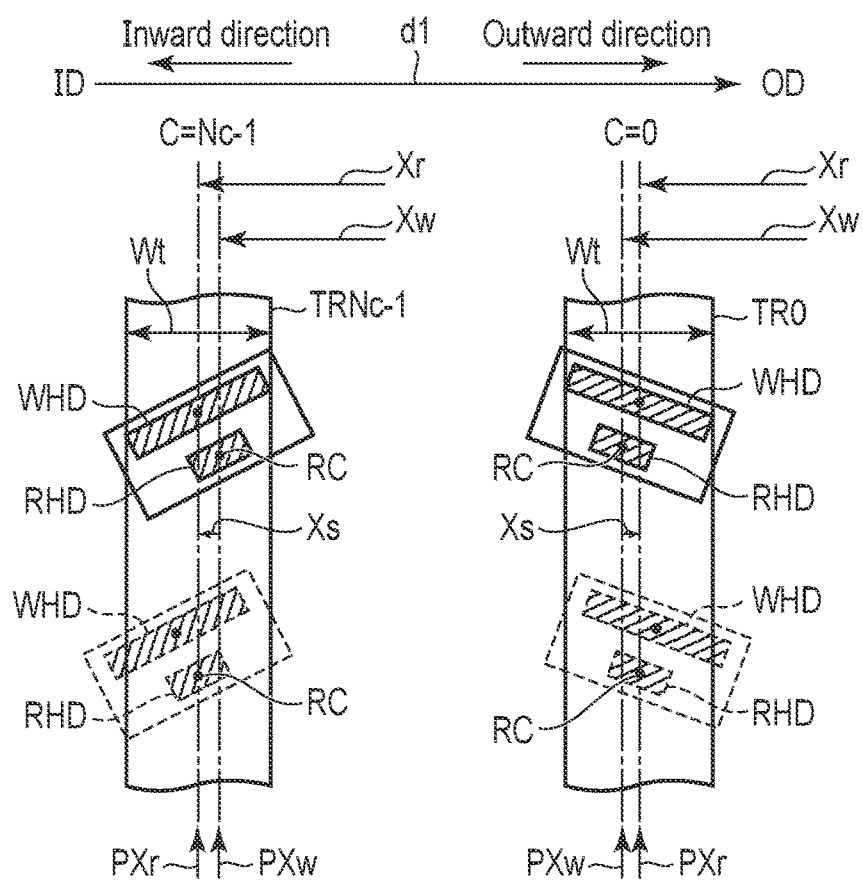
F I G. 6

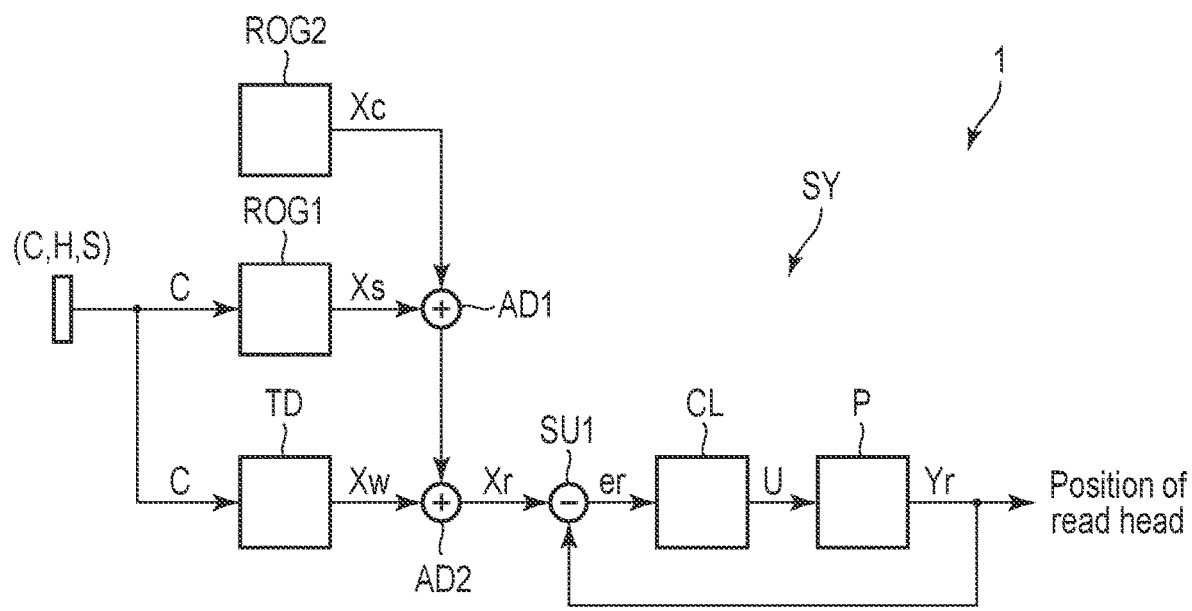
F I G. 12

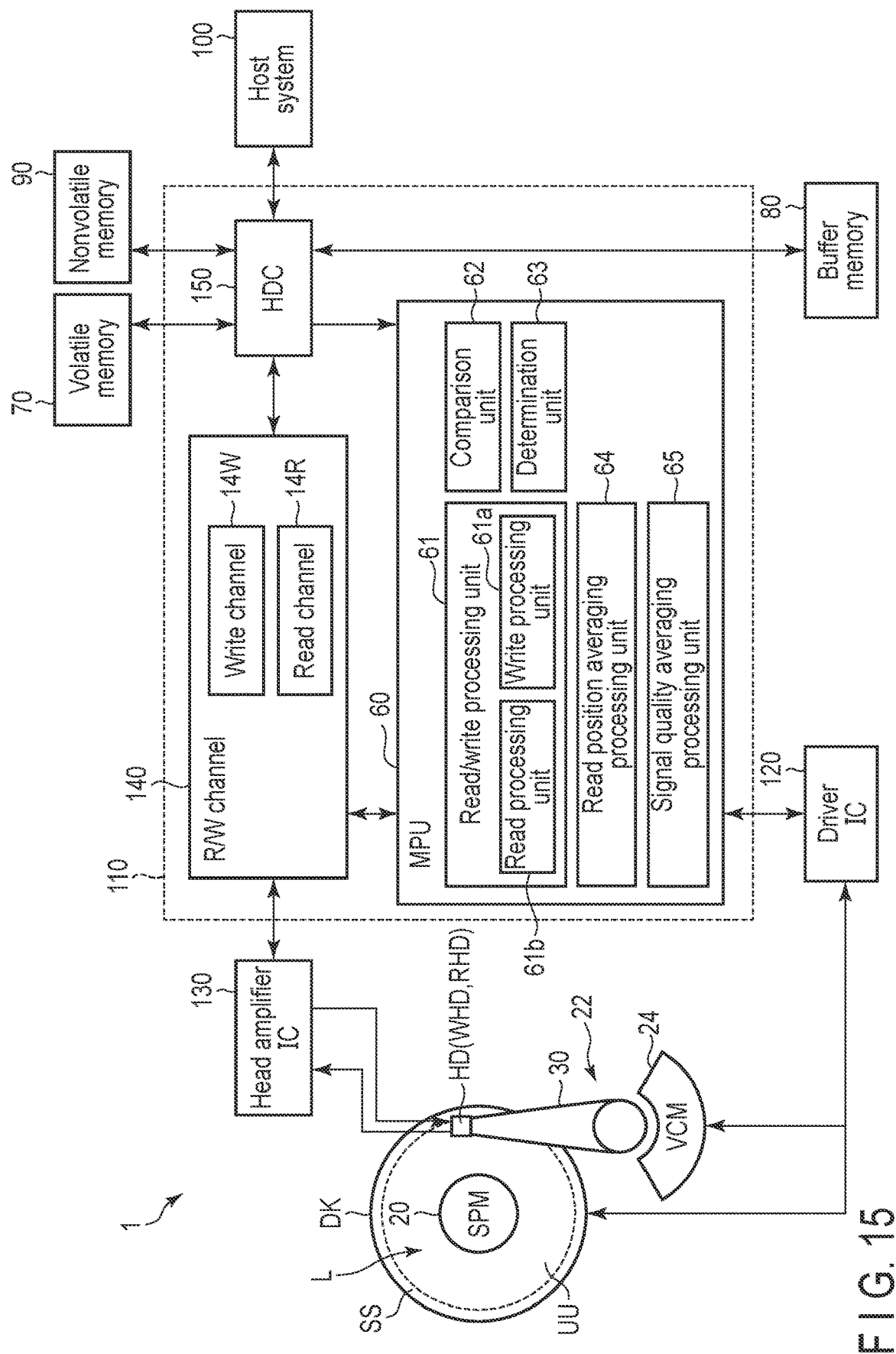
F I G. 15

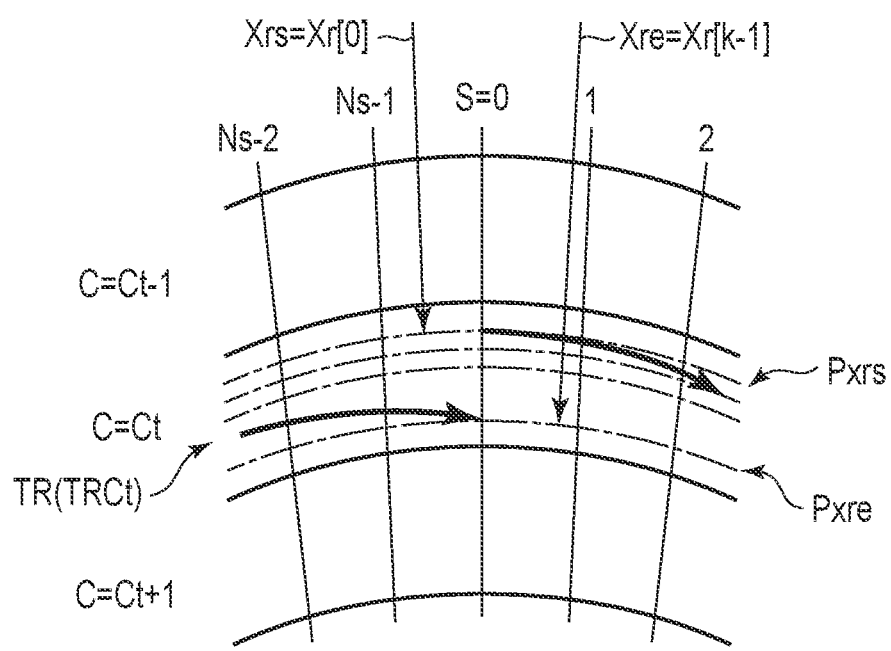
F I G. 16

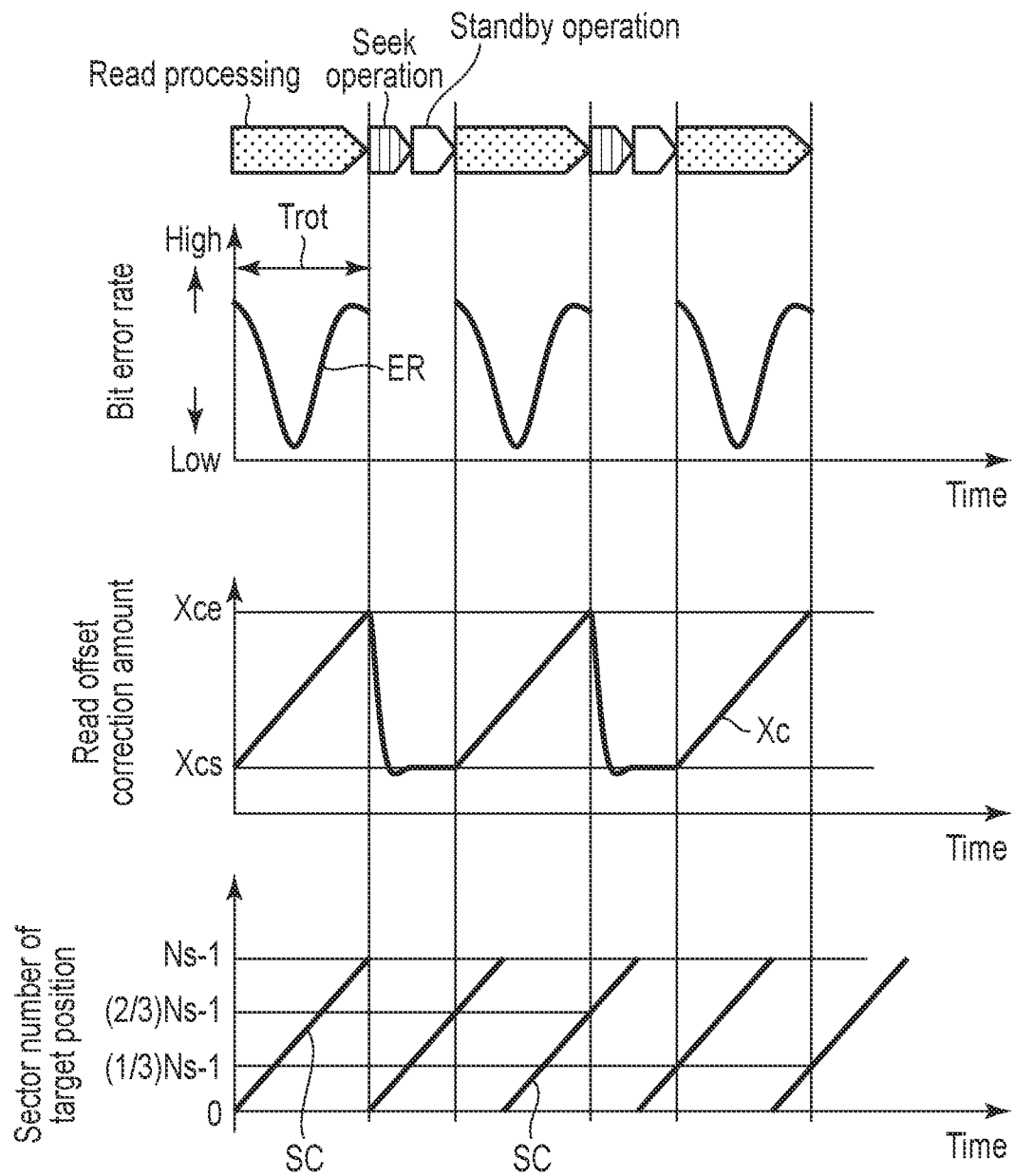
F I G. 22

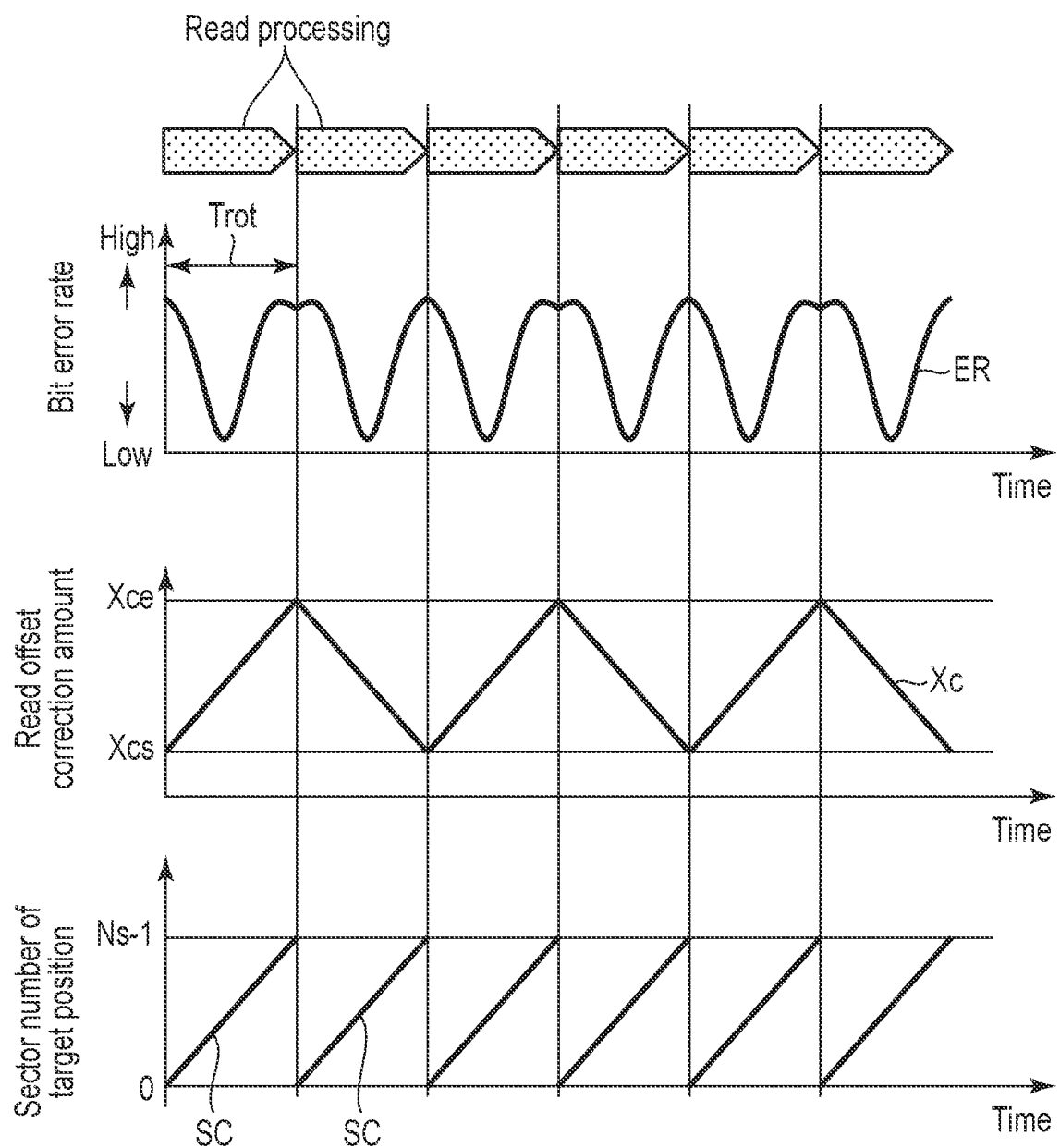
F I G. 23

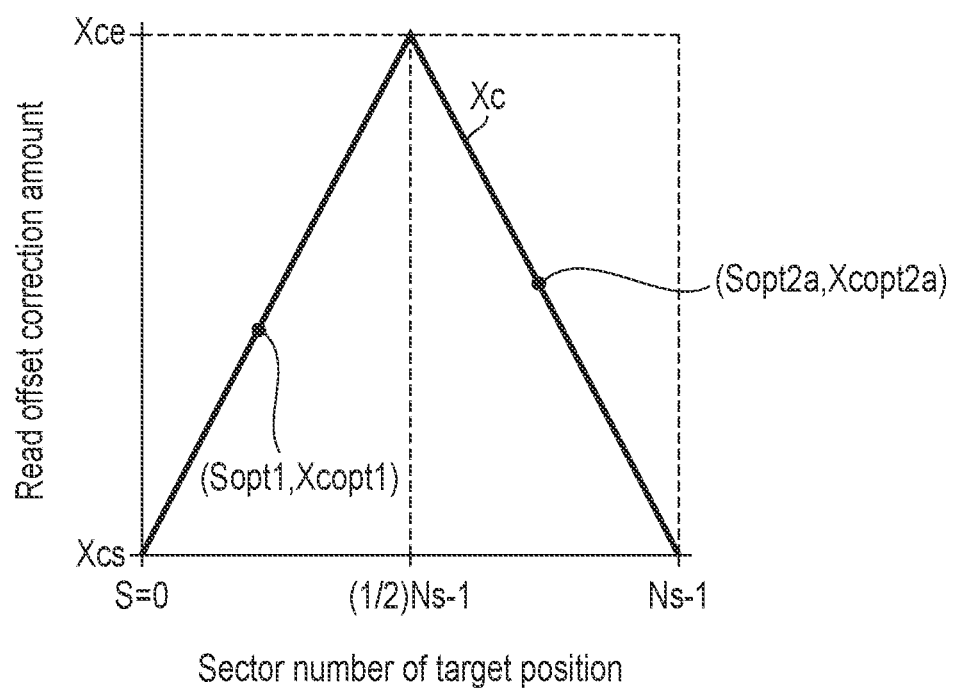
F I G. 24

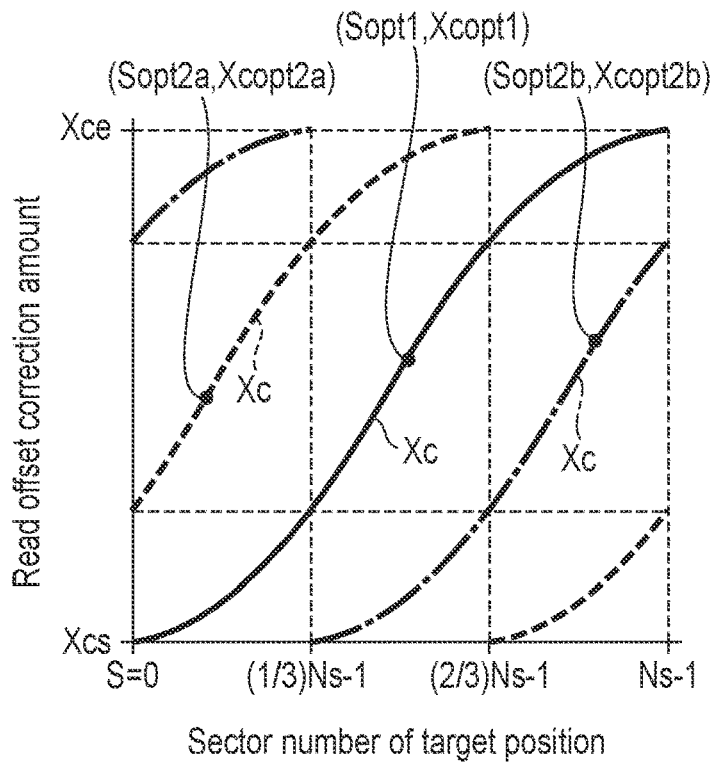
F I G. 28
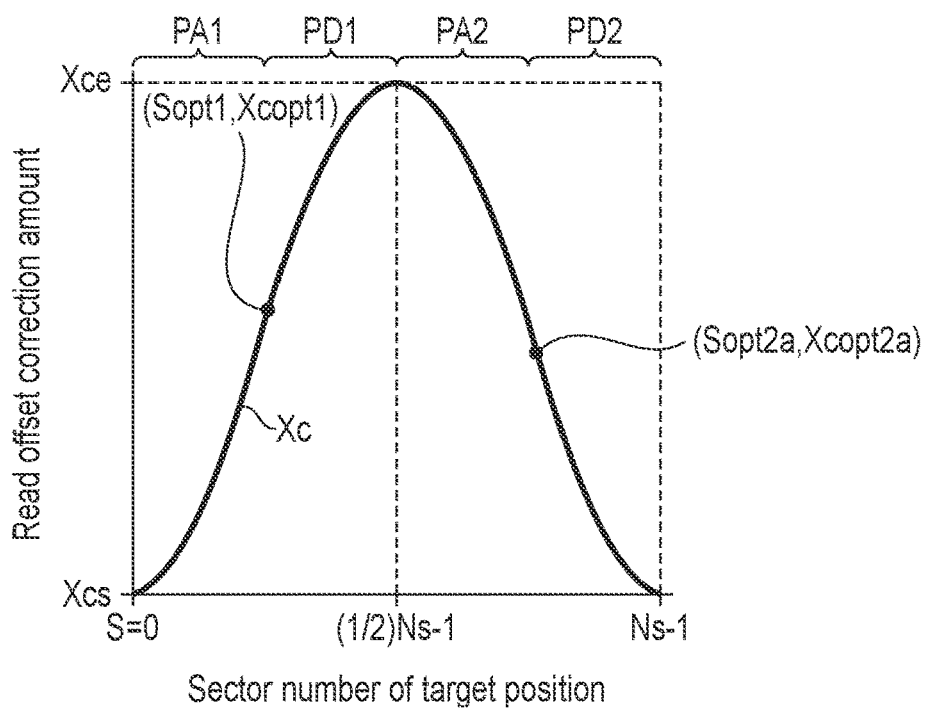
F I G. 29

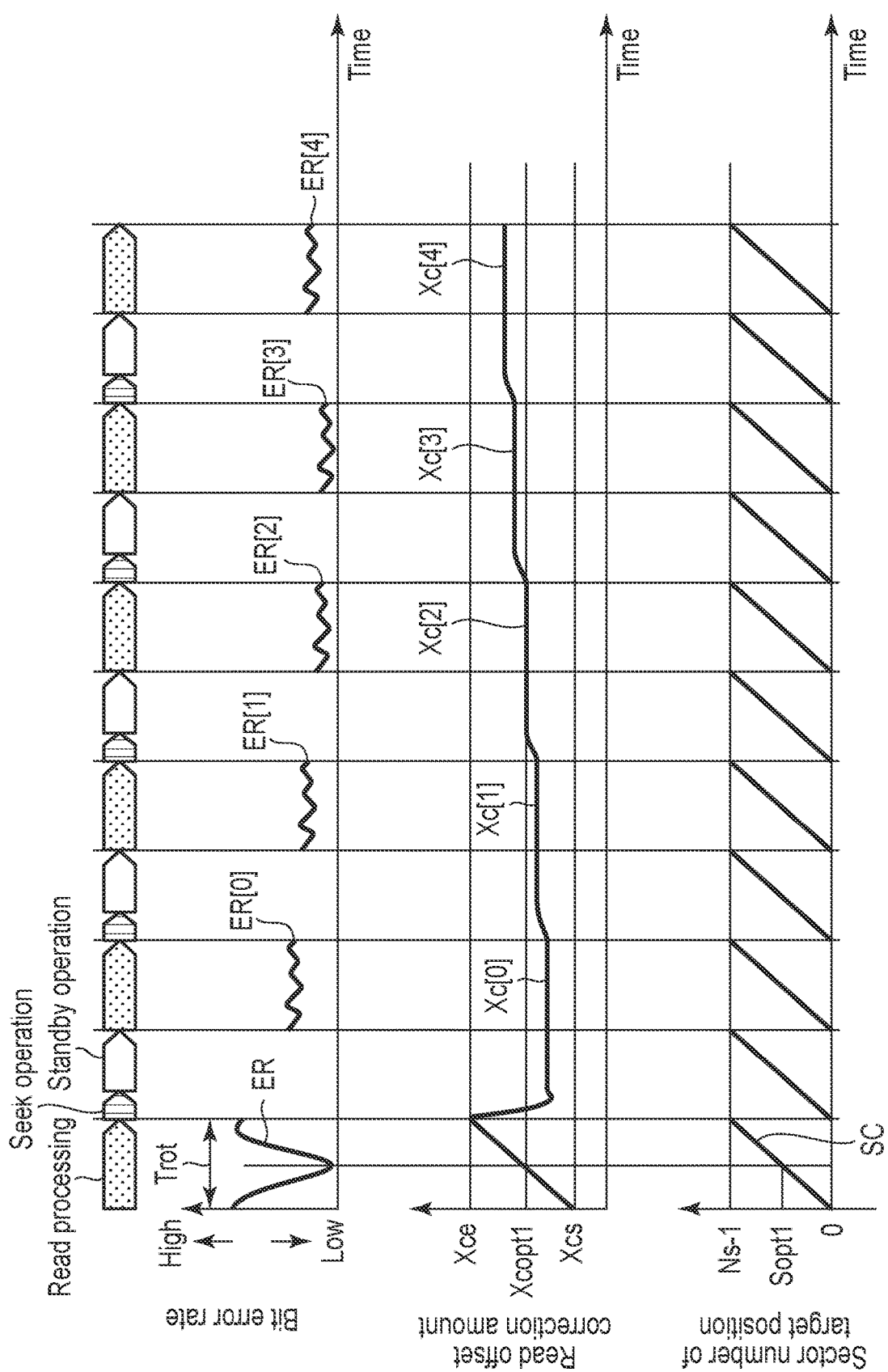
F I G. 30

MAGNETIC DISK DEVICE

CROSS-REFERENCE TO RELATED APPLICATIONS

This application is based upon and claims the benefit of priority from Japanese Patent Application No. 2023-213750, filed Dec. 19, 2023, the entire contents of which are incorporated herein by reference.

FIELD

Embodiments described herein relate generally to a magnetic disk device.

BACKGROUND

As a magnetic disk device, there are known a conventional magnetic recording (CMR) (or a conventional recording) magnetic disk device that writes a plurality of tracks at intervals in a radial direction of a disk, a shingled magnetic recording (SMR, or shingled write recording (SWR)) magnetic disk device that overwrites a plurality of tracks in the radial direction of a disk, and a hybrid recording magnetic disk device that selects and executes the conventional magnetic recording and the shingled magnetic recording.

The magnetic disk device has a head including a write head and a read head. The write head and the read head are provided at intervals in the circumferential direction of a disk. As the head is sought to the inner circumferential side of the disk or to the outer circumferential side of the disk, the write head and the read head are more likely to be offset in the radial direction. Therefore, the magnetic disk device can read data of a predetermined track by arranging the read head offset at a position offset by a predetermined distance in the radial direction from the position of the read head when the write head writes the predetermined track to the disk.

BRIEF DESCRIPTION OF THE DRAWINGS

FIG. 1 is a block diagram showing a configuration of a magnetic disk device according to a comparative example.

FIG. 2 is a perspective view showing a part of the magnetic disk device according to the comparative example, and is a view showing a plurality of disks and a plurality of heads.

FIG. 5 is a diagram showing an example of a geometric arrangement of the head to a track in the case in which a gravity center of a write head and a gravity center of a read head are arranged in a circumferential direction, the case in which the head faces an innermost track, and the case in which the head faces an outermost track in the comparative example.

FIG. 6 is a diagram showing a positional relationship between the innermost track and the head in write processing and read processing and a positional relationship between the outermost track and the head in write processing and read processing in the comparative example.

FIG. 12 is a block diagram showing an example of a positioning control system of the head according to the comparative example.

FIG. 15 is a block diagram showing a configuration of a magnetic disk device according to a first embodiment.

FIG. 16 is a diagram that describes the movement of a head when reading the data of a track while changing a read offset correction amount in the first embodiment, and is a diagram showing a state in which the data of the track is read while moving a read head from a first radial position to a last radial position.

FIG. 22 is graphs showing changes in the bit error rate, changes in the read offset correction amount, and changes in the sector number at a target position in the case in which read processing, a seek operation, and a standby operation are repeatedly performed on a target track in Modification 1 of the first embodiment.

FIG. 23 is graphs showing changes in the bit error rate, changes in the read offset correction amount, and changes in the sector number of a target position in the case in which read processing performed on a target track while moving the read head in a first seek direction in a linear trajectory in a period in which a disk makes one rotation and read processing performed on the target track while moving the read head in a second seek direction in a linear trajectory in a period in which the disk makes one rotation are repeatedly performed in Modification 2 of the first embodiment.

FIG. 24 is a graph showing changes in the read offset correction amount to the position (radial position) of the target sector in Modification 3 of the first embodiment, and is a graph showing an example in which the read offset correction amount is changed in a linear trajectory right-upward and then the read offset correction amount is changed in a linear trajectory right-downward in a period in which the disk makes one rotation.

FIG. 28 is a view showing changes in the read offset correction amount to the position (radial position) of the target sector by three types of graphs in Modification 7 of the first embodiment, and is a view showing an example in which the read start position is shifted in the circumferential direction three times and the read offset correction amounts are changed in the same sinusoidal trajectory.

FIG. 29 is a graph showing changes in the read offset correction amount to the position (radial position) of the target sector in Modification 8 of the first embodiment, and is a graph showing an example in which the read offset correction amount is changed in a sinusoidal trajectory right-upward and then the read offset correction amount is changed in a sinusoidal trajectory right-downward in a period in which the disk makes one rotation.

FIG. 30 is graphs showing changes in the bit error rate, changes in the read offset correction amount, and changes in the number of a target sector in the case in which read processing, a seek operation, and a standby operation are repeatedly performed on a target track in the magnetic disk device according to the second embodiment, and is a diagram showing an example in which the bit error rate is roughly measured in a first range, and then the bit error rate is precisely measured in a second range narrower than the first range.

DETAILED DESCRIPTION

Figure 3:
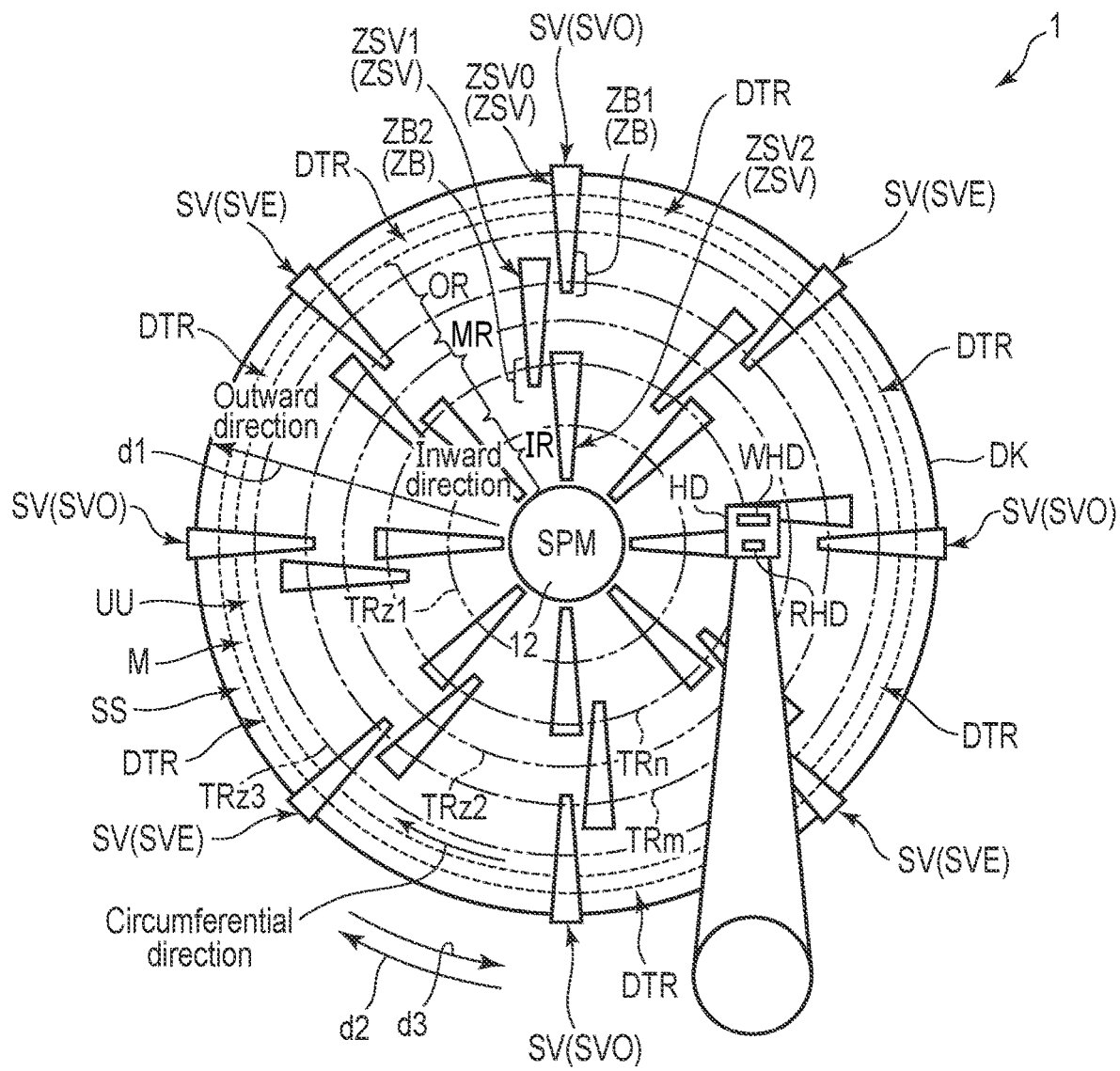
FIG. 3 is a schematic view showing an example of the arrangement of a plurality of servo regions and a plurality of data regions of one disk according to the comparative example.

In general, according to one embodiment, there is provided a magnetic disk device comprising: a disk having a track in a recording layer; a read head that reads data from the recording layer of the disk; and a control unit. The control unit includes: a read processing unit that executes first read processing of moving the read head to n1 radial positions shifted from each other in a radial direction of the disk within a period in which the disk makes m1 rotations and reading the data of the track at each of the radial positions; a comparison unit that compares qualities of a plurality of first signals obtained by reading in the first read processing and derives a first signal of highest quality from among the first signals; and a determination unit that determines, among n1 radial positions, a radial position at which the first signal of the highest quality is derived as a first appropriate read position appropriate for reading the data of the track. Where $1 \leq m1 < n1$.

In the following, magnetic disk devices 1 and a method of searching for an appropriate read position (appropriate read offset correction amount) according to a comparative example and embodiments will be described in detail with reference to the drawings.

Comparative Example

First, a configuration of a magnetic disk device 1 according to a comparative example will be described. FIG. 1 is a block diagram showing a configuration of the magnetic disk device 1 according to the comparative example. In the present comparative example, the magnetic disk device 1 is a hybrid recording magnetic disk device. However, the magnetic disk device 1 may be a shingled magnetic recording magnetic disk device or a conventional magnetic recording magnetic disk device.

As shown in FIG. 1, the magnetic disk device 1 includes a plurality of disks (magnetic disks) DK as recording media, for example, 1 to 11 disks DK, a spindle motor (SPM) 20 as a drive motor, a head stack assembly (in the following, referred to as HSA) 22, a driver IC 120, a head amplifier integrated circuit (in the following, referred to as a head amplifier IC or a preamplifier) 130, a volatile memory 70, a buffer memory (buffer) 80, a nonvolatile memory 90, and a system controller 110 as a one-chip integrated circuit. The magnetic disk device 1 is connected to a host system (in the following, simply referred to as a host) 100.

Each disk DK is formed to have a diameter of 97 mm (3.8 inches), for example, and has recording layers (magnetic recording layers) L on its both surfaces. The disk DK has tracks in the recording layer L. The disk DK is attached to the SPM 20 and rotates by driving of the SPM 20. Note that in the present comparative example, the magnetic disk device 1 includes 1 to 11 disks DK, but the number of disks DK is not limited to this number.

An arm 30 and a voice coil motor (in the following, referred to as VCM) 24 constitute an actuator. The actuator can control the movement of the head HD mounted on the arm 30 to a predetermined position of the disk DK by driving of the VCM 24, i.e., can seek the head HD. As will be described later, the magnetic disk device 1 includes the disks DK and a plurality of heads HD.

In the disk DK, a user data region UU available to a user and a system region SS in which information necessary for system management is written are allocated to a region where the data can be written. Note that a media cache region (or sometimes referred to as a media cache) that temporarily holds data (or a command) transferred from the host 100 or the like before being written to a predetermined region of the user data region UU may be further allocated to the disk DK.

The head HD records and reads information on and from the disk DK. The head HD has a slider as a main body, and includes a write head WHD and a read head RHD mounted on the slider. The arm 30 supports the read head RHD and the write head WHD. The write head WHD writes data to the recording layer L of the disk DK. The read head RHD reads data from a track (data track) of the recording layer L of the disk DK.

The driver IC 120 controls the driving of the SPM 20 and the VCM 24 according to control of the system controller 110 (specifically, an MPU 60, described later). The SPM 20 supports and rotates the disks DK.

The head amplifier IC 130 includes a read amplifier and a write driver. The read amplifier amplifies a read signal read from the disk DK and outputs the amplified read signal to the system controller 110 (specifically, a read/write (R/W) channel 140, described later). The write driver outputs a write current corresponding to a signal output from the R/W channel 140 to the head HD. In the following, "writing data" is sometimes referred to as "writing", "data write", "write processing", or the like. "Reading data" is sometimes referred to as "reading", "data reading", "read processing", or the like.

Note that the write head WHD is sometimes simply referred to as a head HD, the read head RHD is sometimes simply referred to as a head HD, or the write head WHD and the read head RHD are sometimes collectively referred to as a head HD. The center (center of gravity) of the head HD is sometimes simply referred to as the head HD, the center (center of gravity) of the write head WHD is sometimes simply referred to as the write head WHD, and the center (center of gravity) of the read head RHD is sometimes simply referred to as the read head RHD.

The "center (center of gravity)" of the write head WHD is sometimes simply referred to as "the head HD", or the "center (center of gravity)" of the read head RHD is sometimes simply referred to as "the head HD". "Positioning the center of the head HD at the track center of a predetermined track" is sometimes expressed as "positioning the head HD on a predetermined track", "placing the head HD on a predetermined track", "locating the head HD on a predetermined track", or the like.

The volatile memory 70 is a semiconductor memory in which stored data is lost when power supply is cut off. The volatile memory 70 stores data and the like necessary for processing in each unit of the magnetic disk device 1. The volatile memory 70 is a random access memory (RA). The volatile memory 70 is, for example, a dynamic random access memory (DRAM). However, the volatile memory 70 may be a synchronous dynamic random access memory (SDRAM).

The buffer memory 80 is a semiconductor memory that temporarily records data and the like transmitted and received between the magnetic disk device 1 and the host 100. Note that the buffer memory 80 may be formed integrally with the volatile memory 70. The buffer memory 80 is a volatile RAM. For example, the buffer memory 80 is a DRAM, a static random access memory (SPAM), an SDRAM, a ferroelectric random access memory (FeRAM), a magnetoresistive random access memory (MRAM), and any other memory.

The nonvolatile memory 90 is a semiconductor memory that records stored data even when power supply is cut off. The nonvolatile memory 90 is, for example, a NAND flash read only memory (FROM). However, the nonvolatile memory 90 may be a NOR-type FROM.

The system controller (controller) 110 is achieved by using, for example, a large-scale integrated circuit (LSI) referred to as a system-on-a-chip (SoC) in which a plurality of elements is integrated on a single chip. The system controller 110 includes the read/write (R/W) channel 140, a hard disk controller (HDC) 150, and the microprocessor (MPU) 60. The system controller 110 is electrically connected to the driver IC 120, the head amplifier IC 130, the volatile memory 70, the buffer memory 80, the nonvolatile memory 90, and the host 100.

The R/W channel 140 executes the signal processing of read data transferred from the disk DK to the host 100 and write data transferred from the host 100 according to an instruction from the MPU 60, described later. The R/W channel 140 includes a write channel 14W and a read channel 14R. The write channel 14W has a circuit or a function of modulating write data. The read channel 14R has a circuit or a function of measuring quality of a plurality of signals obtained by reading by read processing. The quality of the signal is the amplitude of the signal or the bit error rate (BER) of the signal. The R/W channel 140 is electrically connected to, for example, the head amplifier IC 130, the HDC 150, the MPU 60, and the like.

The HDC 150 controls data transfer between the host 100 and the R/W channel 140 according to an instruction from the MPU 60, described later. The HDC 150 is electrically connected to, for example, the R/W channel 140, the MPU 60, the volatile memory 70, the buffer memory 80, the nonvolatile memory 90, and the like.

The MPU 60 is a control unit that controls the components of the magnetic disk device 1, and is a main controller. The MPU 60 controls the VCM 24 via the driver IC 120 to execute servo control that positions the head HD. In addition, the MPU 60 controls the SPM 20 via the driver IC 120 to rotate the disk DK. The MPU 60 controls a write operation of data to the disk DK and selects a storage destination of write data transferred from the host 100. In addition, the MPU 60 controls a read operation of data from the disk DK and controls the processing of read data transferred from the disk DK to the host 100. The MPU 60 is connected to each unit of the magnetic disk device 1. For example, the MPU 60 is electrically connected to the driver IC 120, the R/W channel 140, the HDC 150, and any other component.

The MPU 60 includes a read/write processing unit 61, a comparison unit 62, a determination unit 63, and a signal quality averaging processing unit 65. The MPU 60 executes the processing of these components, for example, the read/write processing unit 61, the comparison unit 62, the determination unit 63, the signal quality averaging processing unit 65, and any other component on firmware. The MPU 60 may include these units as a circuit.

The read/write processing unit 61 includes a write processing unit 61a and a read processing unit 61b. In accordance with a command from the host 100, the write processing unit 61a controls data write processing to the recording layer L of the disk DK, and the read processing unit 61b controls data read processing from the recording layer L of the disk DK. The read/write processing unit 61 controls the VCM 24 via the driver IC 120, positions the head HD at a target position (predetermined radial position) on the disk DK, and executes read processing or write processing.

The comparison unit 62 can compare the qualities of a plurality of signals obtained by reading by read processing and derive a signal of the highest quality from among the signals.

The determination unit 63 can determine the radial position at which the signal of the highest quality is derived among the radial positions on one track of the recording layer L as an appropriate read position appropriate for reading the data of the track.

The signal quality averaging processing unit 65 can derive a plurality of averaging qualities. Each averaging quality is a quality obtained by averaging a plurality of qualities of signals obtained by a plurality of times of reading by read processing at one radial position on the track of the recording layer L.

FIG. 2 is a perspective view showing a part of the magnetic disk device 1, and is a view showing multiple disks DK and multiple heads HD.

As shown in FIG. 2, a direction in which the disk DK rotates in the circumferential direction of the disk DK is referred to as a rotation direction d3. Note that in the example shown in FIG. 2, although the rotation direction is indicated in the counterclockwise direction, the rotation direction may be the opposite direction (clockwise direction). A traveling direction d2 of the head HD to the disk DK is opposite to the rotation direction d3. The traveling direction d2 is a direction in which the head HD sequentially writes and reads data to the disk DK in the circumferential direction, i.e., a direction in which the head HD travels on the disk DK in the circumferential direction.

The magnetic disk device 1 includes i disks of disks DK1 to DKi, and j heads of heads HD1 to HDj. In the present comparative example, the number of heads HD is twice the number of disks DK (j=2×i).

The disks DK1 to DKi are coaxially provided and stacked with a certain gap. The diameters of the disks DK1 to DKi are the same. The terms such as "the same", "identical", "match", and "equivalent" include the meaning of exactly the same as well as the meaning of being different to the extent that can be regarded as being substantially the same. Note that the diameters of the disks DK1 to DKi may be different from each other.

Each disk DK has recording layers L on both sides. For example, the disk DK1 includes a first recording layer La1 and a second recording layer Lb1 on the opposite side of the first recording layer La1. The disk DK2 includes a first recording layer La2 and a second recording layer Lb2 opposite to the first recording layer La2. The disk DKi includes a first recording layer Lai and a second recording layer Lbi opposite to the first recording layer Lai. Each of the first recording layers La is sometimes referred to as a front surface or a recording surface. Each of the second recording layers Lb is sometimes referred to as a back surface or a recording surface. However, each of the first recording layers La may be referred to as the back surface. In this case, each of the second recording layers Lb may be referred to as the front surface.

Each recording layer L has the user data region UU and the system region SS. The first recording layer La1 has a user data region UUa1 and a system region SSa1. The second recording layer Lb1 has a user data region UUb1 and a system region SSb1. The first recording layer La2 has a user data region UUa2 and a system region SSa2. The second recording layer Lb2 has a user data region UUb2 and a system region SSb2. The first recording layer Lai includes a user data region UUai and a system region SSai. The second recording layer Lbi has a user data region UUbi and a system region SSbi.

In the user data region UUa1 (first recording layer La1), a track sandwiched by double dashed lines in the drawing is defined as a track TRa1. In the user data region UUb1 (second recording layer Lb1), a track located on the opposite side of the track TRa1 is defined as a track TRb1.

In the user data region UUa2 (first recording layer La2), a track sandwiched by double dashed lines in the drawing is defined as a track TRc1. In the user data region UUb2 (second recording layer Lb2), a track located on the opposite side of the track TRc1 is defined as a track TRd1.

In the user data region UUai (first recording layer Lai), a track sandwiched by double dashed lines in the drawing is defined as a track TRe1. In the user data region UUbi (second recording layer Lbi), a track located on the opposite side of the track TRe1 is defined as a track TRf1.

In the present comparative example, the tracks TRa1, TRb1, TRc1, TRd1, TRe1, and TRf1 are located in the same cylinder.

The head HD faces the disk DK. In the present comparative example, one head HD faces each recording layer L of the disk DK. For example, the head HD1 faces the first recording layer La1 of the disk DK1, writes data in the first recording layer La1, and reads data from the first recording layer La1. The head HD2 faces the second recording layer Lb1 of the disk DK1, writes data in the second recording layer Lb1, and reads data from the second recording layer Lb1.

The head HD3 faces the first recording layer La2 of the disk DK2, writes data in the first recording layer La2, and reads data from the first recording layer La2. The head HD4 faces the second recording layer Lb2 of the disk DK2, writes data in the second recording layer Lb2, and reads data from the second recording layer Lb2. The head HDj−1 faces the first recording layer Lai of the disk DKi, writes data to the first recording layer Lai, and reads data from the first recording layer Lai. The head HDj faces the second recording layer Lbi of the disk DKi, writes data in the second recording layer Lbi, and reads data from the second recording layer Lbi.

Note that a predetermined position in the radial direction d1 of the disk DK is sometimes referred to as a radial position, and a predetermined position in the circumferential direction of the disk DK is sometimes referred to as a circumferential position. The radial position and the circumferential position are sometimes collectively referred to simply as a position. The radial position corresponds to a distance from the rotation center of the disk DK to a predetermined radial position, a distance from the innermost circumference of the disk DK to a predetermined radial position, a distance from the outermost circumference of the disk DK to a predetermined radial position, a distance from a predetermined radial position of the disk DK to another radial position, and the like.

FIG. 3 is a schematic diagram showing an example of the arrangement of a plurality of servo regions SV and a plurality of data regions DTR of one disk DK according to the present comparative example. As shown in FIG. 3, in the radial direction d1 of the disk DK, a direction toward the outer circumference of the disk DK is referred to as an outward direction (outer side), and a direction opposite to the outward direction is referred to as an inward direction (inner side).

In FIG. 3, the user data region UU is divided into an inner region IR located in the inward direction, an outer region OR located in the outward direction, and a middle region MR located between the inner region IR and the outer region OR.

The disk DK has a plurality of servo regions SV and a plurality of data regions DTR. For example, the servo regions SV may extend radially in the radial direction of the disk DK and be discretely arranged at predetermined intervals in the circumferential direction. For example, the servo regions SV may extend linearly from the inner circumference to the outer circumference and be discretely arranged at predetermined intervals in the circumferential direction. For example, the servo regions SV may extend spirally from the inner circumference to the outer circumference, and may be discretely arranged at predetermined intervals in the circumferential direction. Furthermore, for example, the servo regions SV may be arranged in an island shape in the radial direction and discretely arranged with predetermined intervals changed in the circumferential direction.

In the following, one servo region SV in a predetermined track is sometimes referred to as a "servo sector". Note that the "servo region SV" is sometimes referred to as a "servo sector SV". The servo sector includes servo data. In the following, the "arrangement or the like of some pieces of servo data constituting a servo sector" is sometimes referred to as a "servo pattern". Note that "servo data written in a servo sector" is sometimes referred to as "servo sector".

Each of the data regions DTR is arranged between the servo regions SV. For example, the data region DTR corresponds to a region between two continuous servo regions SV in the circumferential direction. In the following, one data region DTR in a predetermined track is sometimes referred to as a "data sector". Note that the "data region DTR" is sometimes referred to as a "data sector DTR". The data sector includes user data. Note that the "user data written to the data sector" is sometimes referred to as a "data sector". The "data sector" is sometimes referred to as "user data". A "pattern including some data" is sometimes referred to as a "data pattern". In the example shown in FIG. 3, the data pattern of the predetermined track includes a plurality of pieces of servo data (servo sectors) and a plurality of pieces of user data (data sectors).

The servo region SV includes a plurality of zone servo regions ZSV and the like. In addition to the zone servo region ZSV, the servo region SV may include a region including a gap (deviation of circumferential positions of two zone servo regions), a region including servo data, a data region DTR, and the like. A plurality of zone servo regions ZSV is discretely arranged along the radial direction. Each of the zone servo regions ZSV extends in the radial direction.

One zone servo region (servo region) ZSV in a predetermined track is sometimes referred to as a "zone servo sector" or a "servo sector". Note that the "zone servo region (servo region) ZSV" is sometimes referred to as a "zone servo sector ZSV" or a "servo sector ZSV". The "servo data written in the zone servo sector" is sometimes referred to as a "zone servo sector" or a "servo sector". In the following, the "arrangement or the like of some pieces of servo data constituting the zone servo sector" is sometimes referred to as a "zone servo pattern" or a "servo pattern". In the following, one servo region SV in a predetermined track is sometimes referred to as a "zone pattern sector".

Note that the "servo region SV" is sometimes referred to as a "zone pattern sector". "At least one piece of data or the like written in the zone pattern sector" is sometimes referred to as "zone pattern sector". The zone pattern sector includes at least one zone servo sector. In the following, the "data pattern of the zone pattern sector" is sometimes referred to as a "zone data pattern".

In the example shown in FIG. 3, the servo region SV has zone servo regions ZSV0, ZSV1, and ZSV2. The zone servo regions ZSV0, ZSV1, and ZSV2 are arranged in a staggered manner in the radial direction. The zone servo regions ZSV0, ZSV1, and ZSV2 may be arranged stepwise in the radial direction.

The zone servo region ZSV2 is located on the inner circumferential side of the zone servo region ZSV1. The zone servo region ZSV0 is located on the outer circumferential side of the zone servo region ZSV1. For example, the zone servo region ZSV2 is arranged from the inner region IR to the middle region MR, the zone servo region ZSV1 is arranged from the inner region IR to the outer region OR, and the zone servo region ZSV0 is arranged from the middle region MR to the outer region OR. In the following, in the predetermined servo region SV, a predetermined region in the radial direction in which the zone servo regions ZSV are arranged in the circumferential direction is sometimes referred to as a zone servo boundary region, a double servo region, or a double zone servo region ZB.

In the example shown in FIG. 3, a main servo region SVO and a sub-servo region SVE are alternately arranged at intervals in the circumferential direction. For example, one sub-servo region SVE is arranged between two main servo regions SVO arranged continuously at an interval in the circumferential direction. For example, in the case in which consecutive numbers are sequentially assigned to all the servo regions SV of the disk DK, the main servo region SVO corresponds to an odd-numbered servo region SV, and the sub-servo region SVE corresponds to an even-numbered servo region SV. Note that two or more sub-servo regions SVE may be arranged between two main servo regions SVO arranged continuously at intervals in the circumferential direction.

The main servo region SVO and the sub-servo region SVE may include, for example, only a servo region (in the following, sometimes referred to as a normal servo region) that reads and demodulates servo data as a whole. In the following, "reading and demodulating servo data" is sometimes referred to as "servo reading". The main servo region SVO and the sub-servo region SVE may be composed, for example, a normal servo region and a servo region (in the following, sometimes referred to as a short servo region) that performs servo reading on a circumferential range of servo data smaller than a circumferential range of servo data that performs servo reading in the normal servo region.

A media cache M is allocated to the disk DK. However, the media cache M does not necessarily have to be arranged on the disk DK.

By using the pieces of servo data described above, the head HD can be positioned so as to obtain a predetermined off-track amount.

Figure 4:
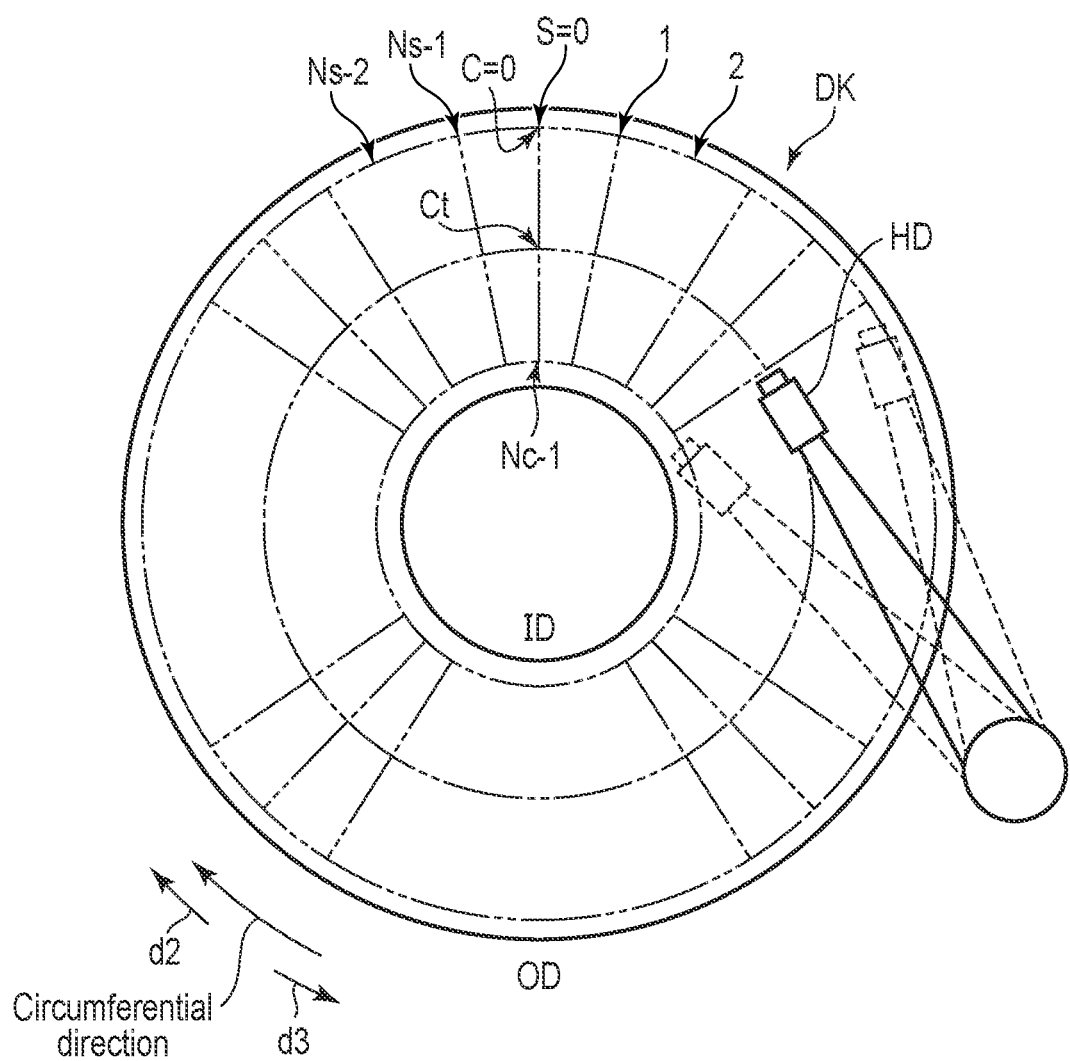
FIG. 4 is a schematic diagram showing an example of an arrangement of heads to a disk according to the comparative example.

FIG. 4 is a schematic diagram showing an example of the arrangement of the head HD to the disk DK according to the present comparative example.

As shown in FIG. 4, a track number (cylinder number) is allocated to a concentric track (data track) formed from an outer OD toward an inner ID of the disk DK. When the number of tracks is Nc, a track number C is 0 to Nc−1 (C=0, 1, 2, ..., Nc−1).

Each track has a plurality of sectors. A sector number is allocated to the traveling direction d2 of the head HD. When the number of sectors is Ns, a sector number S is 0 to Ns−1 (S=0, 1, 2, ..., Ns−1).

When the head HD floats over the rotating disk DK, the distance between the head HD and the recording layer L (surface) of the disk DK is maintained within a certain range. The head HD includes the write head WHD and the read head RHD. The write head WHD and the read head RHD are arranged in the circumferential direction (FIG. 3). Data on the track written (recorded) by the write head WHD can be read by the read head RHD.

FIG. 5 is a diagram showing an example of the geometric arrangement of the head HD to the track in the case in which a gravity center WC of the write head WHD and a gravity center RC of the read head RHD are arranged in the circumferential direction, the case in which the head HD faces the innermost track, and the case in which the head HD faces the outermost track in the present comparative example. Note that each dashed-dotted line in the drawing represents the center (track center) of the corresponding track.

As shown in FIG. 5, in a seek direction, the write head WHD has a width (core width) Ww, and the read head RHD has a width (core width) Wr. The head HD is moved in the seek direction (substantially the inward direction or the outward direction) by the actuator, and is position-controlled on a target track. In each sector, servo information indicating a radial position on the disk DK is recorded. By reading the servo information by the read head RHD, the radial position of the head HD on the disk DK can be detected. As will be described later, the seek direction is a first seek direction (e.g., a substantially inward direction) or a second seek direction (e.g., a substantially outward direction).

Since the actuator is generally a rotary actuator, the head HD has a skew angle to the track depending on the radial position of the head HD on the disk DK. In general, the write head WHD and the read head RHD are arranged in the rotation direction of the disk DK.

For example, in the case in which the head HD is positioned on the track whose track number C is Ct, the write head WHD is not sometimes to be offset to the outer circumferential side or the inner circumferential side of the read head RHD. When the head HD is positioned on the outer track of the disk DK, the write head WHD is offset to the outer circumferential side of the read head RHD. Conversely, when the head HD is positioned on the inner track of the disk DK, the write head WHD is offset to the inner circumferential side of the read head RHD.

FIG. 6 is a diagram showing a positional relationship between a track TRNc−1, which is the innermost track in the write processing and the read processing, and the head HD and a positional relationship between a track TR0, which is the outermost track in the write processing and the read processing, and the head HD in the present comparative example.

On the left side of FIG. 6, the positional relationship between the head HD and the track TRNc−1 during the write operation and the read operation in the track TRNc−1 whose track number C is Nc−1 is shown. The head HD indicated by a solid line indicates a position during the write operation, and a head HD indicated by a dashed line indicates a position during the read operation.

When the track TRNc−1 having a track width Wt is formed by the write head WHD, the read head RHD is positioned at a radial position PXw offset by a distance Xs from the write head WHD to the outer OD side (radial direction d1) by the skew angle. In the direction parallel to the radial direction d1, the distance from the reference position to the read head RHD during the write operation is Xw. Note that the reference position is, for example, the center (track center) of the track TR0.

In order to read the data of the track TRNc−1, it is necessary to position the position of the read head RHD at a radial position PXr offset from the position at the time of the write operation toward the inner ID side by the distance Xs. In the direction parallel to the radial direction d1, the distance from the reference position to the read head RHD during the read operation is Xr. In the above case, the distance Xs is the read offset shift amount.

On the right side of FIG. 6, the positional relationship between the head HD and the track TR0 during the write operation and the read operation in the track TR0 whose track number C is 0 is shown. The head HD indicated by a solid line indicates a position during the write operation, and a head HD indicated by a dashed line indicates a position during the read operation.

When the track TR0 having the track width Wt is formed by the write head WHD, the read head RHD is positioned at a radial position PXw offset from the write head WHD toward the inner ID side (the opposite direction of the radial direction d1) by a distance Xs by a skew angle.

In order to read the data of the track TR0, it is necessary to position the position of the read head RHD at the radial position PXr offset from the position at the time of the write operation to the outer OD side by the distance Xs.

Figure 7:
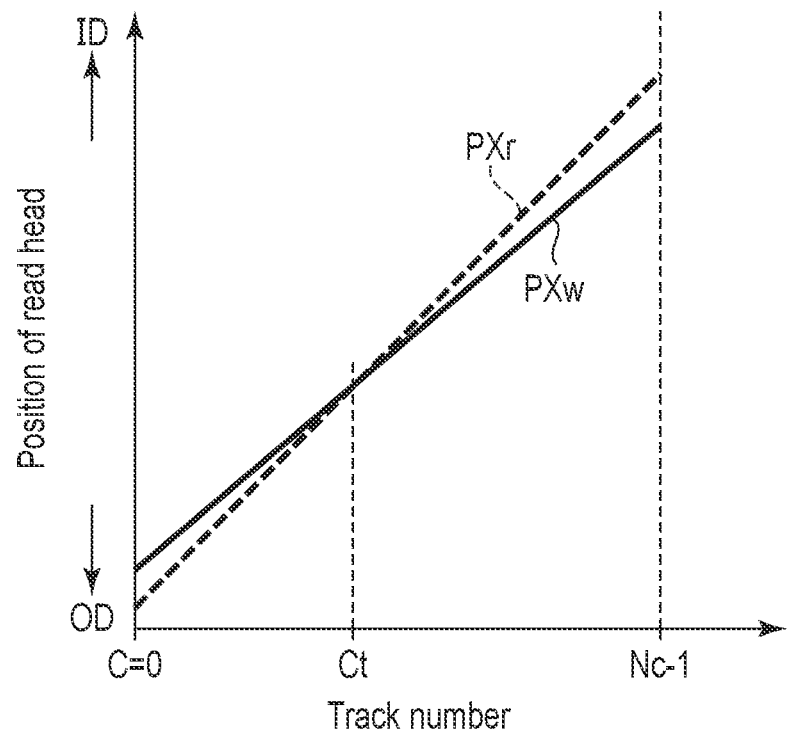
FIG. 7 is a graph showing changes in the position of the read head in a plurality of tracks in the comparative example.

FIG. 7 is a graph showing changes in the position of the read head RHD in the tracks TR in the present comparative example. In the horizontal axis of FIG. 7, the right direction corresponds to the inward direction of the disk DK, and the left direction corresponds to the outward direction of the disk DK. In the vertical axis of FIG. 7, the upward direction corresponds to the inward direction of the disk DK, and the downward direction corresponds to the outward direction of the disk DK.

As shown in FIG. 7, a solid line represents the radial position PXw of the read head RHD during the write processing, and a broken line represents the radial position PXr of the read head RHD during the read processing. It is shown that the positional relationship between the radial position PXw of the read head RHD during the write processing and the radial position PXr of the read head RHD during the read processing is reversed between the inner ID side and the outer OD side.

Figure 8:
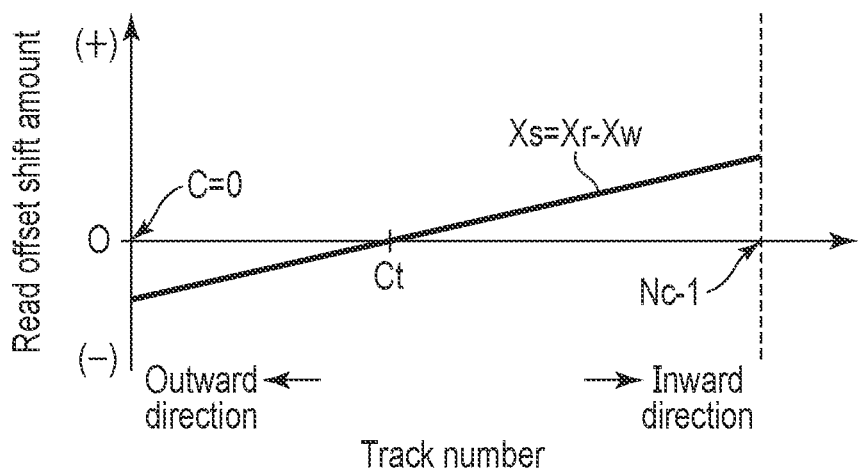
FIG. 8 is a graph showing changes in a read offset shift amount in tracks in the comparative example.

FIG. 8 is a graph showing changes in the read offset shift amounts Xs in the tracks TR in the present comparative example. In the horizontal axis of FIG. 8, the right direction corresponds to the inward direction of the disk DK, and the left direction corresponds to the outward direction of the disk DK. In the vertical axis of FIG. 8, the upward direction corresponds to the inward direction of the disk DK, and the downward direction corresponds to the outward direction of the disk DK.

As shown in FIG. 8, the read offset shift amount Xs can be obtained from the difference between the distance Xr and the distance Xw (Xs=Xr−Xw). In the present comparative example, the read offset shift amount Xs is calculated by the MPU 60 (e.g., the read processing unit 61b). However, the read offset shift amount Xs may not be obtained by calculation. In this case, a memory such as the nonvolatile memory 90 may have a table having information of the read offset shift amount Xs.

In this manner, by positioning the read head RHD at the radial position PXr offset from the radial position PXw at the time of writing by the read offset shift amount Xs according to the skew angle, it is possible to read data at the center position of the track TR.

The positional relationship between the write head WHD and the read head RHD in the head HD, specifically, the positional relationship in the seek direction does not necessarily match between products because there are product differences. For example, there is the case in which an offset occurs between the write head WHD and the read head RHD for some reason including manufacturing variations. In addition, the magnetic field distribution generated by the write head WHD is biased in the radial direction d1 of the disk DK due to the skew angle and product difference described above. Therefore, the center position of the track width Wt of the track TR may not be a read position appropriate for reading the data of the track TR in many cases. Therefore, in addition to the read offset shift amount Xs to the radial position of the target track caused by the skew angle as described above, it is necessary to further obtain an appropriate value Xcopt (e.g., an optimum value) of a read offset correction amount Xc that corrects the read offset shift amount Xs.

Figure 9:
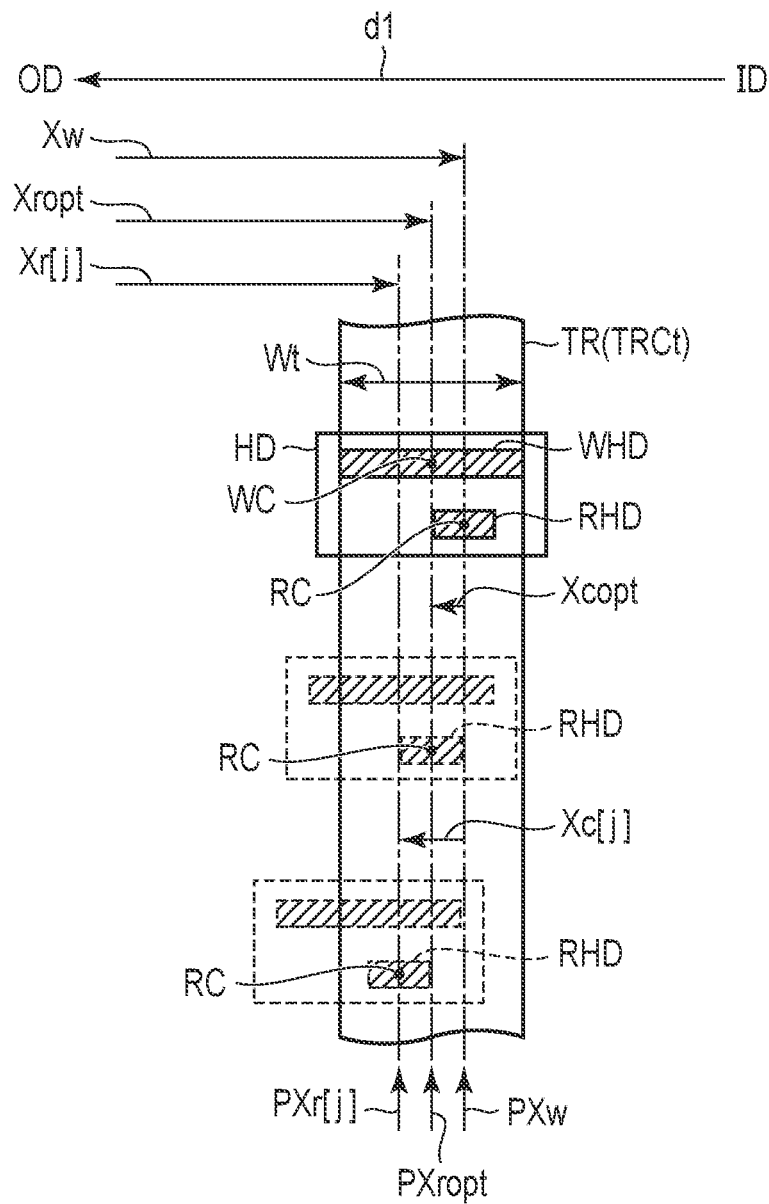
FIG. 9 is a diagram showing a positional relationship between the track and the head in three cases in which read offset correction amounts are different from each other in the comparative example.

FIG. 9 is a diagram showing a positional relationship between the track TR (track TRCt) and the head HD in three cases in which the read offset correction amounts Xc are different from each other in the present comparative example. Note that the read offset shift amount Xs to the target track caused by the skew angle as described above is assumed to be zero, and is not shown.

As shown in FIG. 9, when the read head RHD is positioned at the radial position PXw at the time of writing and the write processing is executed, the write head WHD has a track TR having a track width Wt substantially equal to the width Ww. At this time, it is possible to perform an appropriate read operation when the read head RHD is positioned at an appropriate read position PXropt offset from the radial position PXw by the appropriate read offset correction amount Xcopt due to the deviation of the write head WHD and the read head RHD in the radial direction d1 described above, or the like. In order to obtain the appropriate read offset correction amount Xcopt, the read operation is performed at the radial position PXr[i] to which several read offset correction amounts Xc[i] are applied, and the radial position at which the appropriate (good) read state is obtained. In the case in which the read operation of the track TR is performed at k points, the read operation can be performed at k radial positions PXr[0], PXr[1], PXr[2], . . . , and PXr[k−1].

Here, an appropriate read position PXropt, a first appropriate read position PXropt1, a second appropriate read position PXropt2a, a third appropriate read position PXropt2b, and a third appropriate read position PXropt3 which are described later are based on the descriptions in FIG. 9 and the like. Furthermore, an appropriate read offset correction amount Xcopt, a first appropriate read offset correction amount Xcopt1, a second appropriate read offset correction amount Xcopt2a, a third appropriate read offset correction amount Xcopt2b, and a third appropriate read offset correction amount Xcopt3 which are described later are based on the descriptions in FIG. 9 and the like.

Figure 10:
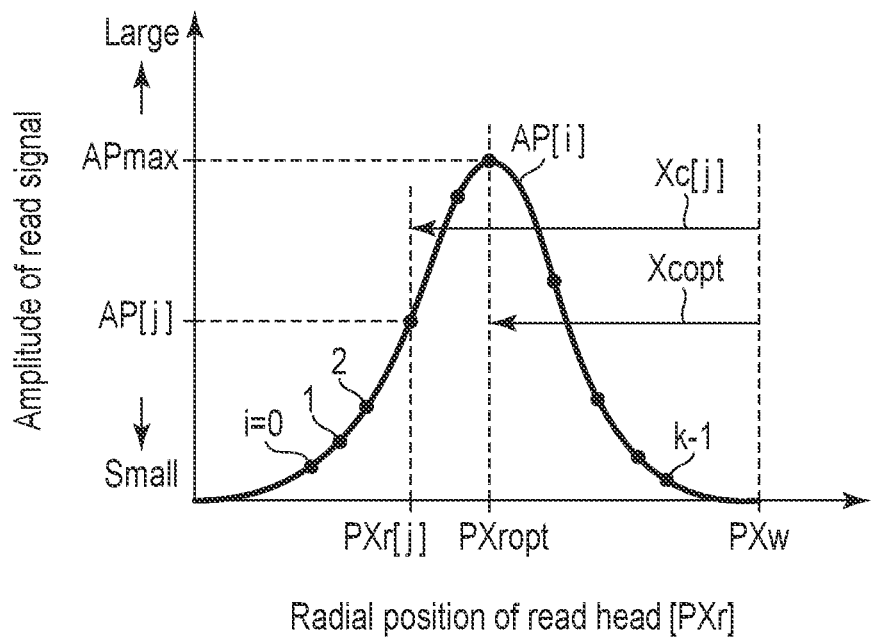
FIG. 10 is a graph showing changes in the amplitude of a read signal to a radial position of a read head in the comparative example.

FIG. 10 is a graph showing changes in the amplitude of a read signal to the radial position of the read head RHD in the present comparative example.

As shown in FIG. 10, the profile of the amplitude AP[i] of the signal when the data on the track TR is read at the radial position PXr[i] to each of the read offset correction amounts Xc[i](Read offset correction amounts Xc[0], Xc[1], Xc[2], . . . , Xc[k−1]) of the k points is graphically shown. Here, the read offset correction amount Xc[i] that the amplitude AP[i] of the signal read by the read head RHD becomes largest can be obtained and set as the appropriate read offset correction amount Xcopt.

In the example of FIG. 10, the signal of the highest quality is a signal having the largest amplitude AP[i] among the signals. Desirably, the highest quality signal is a signal having the maximum amplitude AP[i] among the signals.

Figure 11:
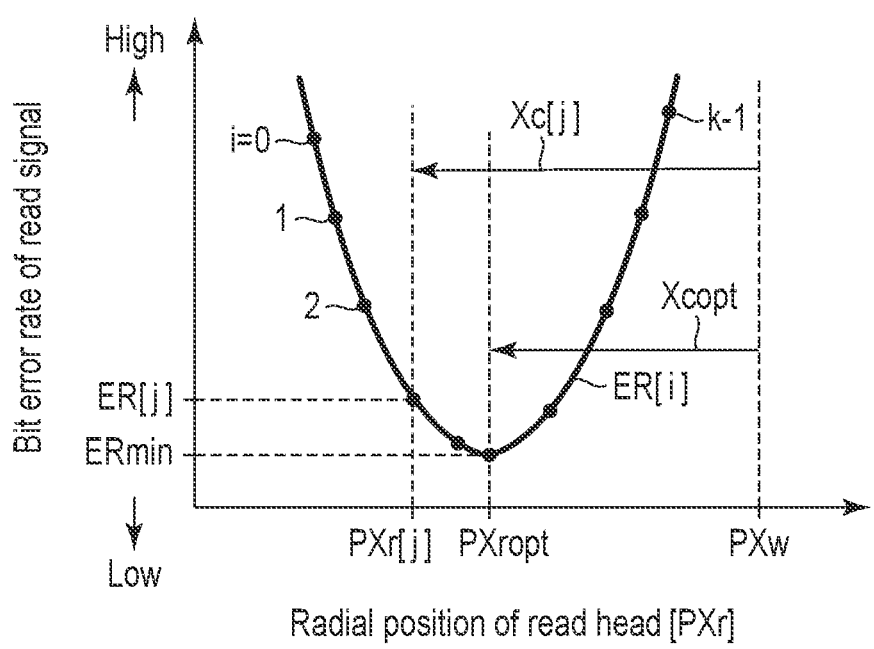
FIG. 11 is a graph showing changes in a bit error rate of a read signal to the radial position of the read head in the comparative example.

FIG. 11 is a graph showing changes in the bit error rate (BER) of the read signal to the radial position of the read head RHD in the present comparative example.

As shown in FIG. 11, the bit error rate of the read signal may be measured instead of the amplitude of the read signal. A profile of the bit error rate ER[i] of the signal when the data on the track TR is read at the radial position PXr[i] for each of the read offset correction amounts Xc[i] of the k points is shown in a graph. Here, the read offset correction amount Xc[i] that minimizes the bit error rate ER[i] of the signal read by the read head RHD can be obtained and set as the appropriate read offset correction amount Xcopt.

In the example of FIG. 11, the signal of the highest quality is a signal having the smallest bit error rate ER[i] among the signals. Desirably, the signal of the highest quality is a signal in which the bit error rate ER[i] becomes minimum among the signals.

In the track center search method of the present comparative example, first, data is written for one cycle in the target track TR. After that, by positioning the read head RHD at a predetermined radial position and reading the data of the track TR by one cycle, the read channel 14R measures a plurality of bit error rates related to the signal, and the signal quality averaging processing unit 65 derives an averaged bit error rate obtained by averaging the plurality of bit error rates. Also in the subsequent search method, the averaged bit error rate is derived while changing the radial position where the read head RHD is positioned.

After that, the comparison unit 62 derives the smallest averaged bit error rate from among the averaged bit error rates, and the determination unit 63 determines the radial position when deriving the smallest averaged bit error rate as the appropriate read position.

FIG. 12 is a block diagram showing an example of a positioning control system SY of the head HD according to the present comparative example.

As shown in FIG. 12, the magnetic disk device 1 includes the positioning control system SY of the head HD. The positioning control system SY includes a transducer (Physical target Transducer For Writing) TD, a generator (Read Offset Generator) ROG1, a generator (Read Offset Generator) ROG2, an adder AD1, an adder AD2, a subtractor SU1, a controller CL, and an actuator P.

The transducer TD, the generator ROG1, the generator ROG2, the adder AD1, the adder AD2, the subtractor SU1, and the controller CL are included in, for example, the head amplifier IC 130, the system controller 110, and the like. The actuator P includes, for example, the arm 30, the VCM 24, and the like. The subtractor SU1, the controller CL, and the actuator P constitute a feedback system.

In the magnetic disk device 1, an address (C, H, S) of a read target sector is instructed from the host 100. Here, for a read target sector, C is a track number (cylinder number), H is a head number, and S is a sector number. The transducer TD converts the address into the distance Xw according to the track number C and outputs the distance Xw. The generator ROG1 converts the address into a read offset shift amount Xs caused by a skew angle (or track number C, radial position, and the like), and outputs the read offset shift amount Xs. The generator ROG2 converts the address into a read offset correction amount Xc due to a factor other than the skew angle, and outputs the read offset correction amount Xc.

As described above with reference to FIGS. 10 and 11, the read offset correction amount Xc can be obtained by measuring the read offset profile of the signal read in the test process before shipment or the like, and an appropriate read offset correction amount Xcopt or the like can be derived. Information on the read offset shift amount Xs and information on the read offset correction amount Xc are input to the adder AD1, and the adder AD1 outputs information (Xs+Xc) obtained by adding the read offset correction amount Xc to the read offset shift amount Xs to the adder AD2. The adder AD2 outputs, to the subtractor SU1, information (Xr=Xw+Xs+Xc) of the distance Xr obtained by adding information (Xs+Xc), which is obtained by adding the read offset correction amount Xc to the read offset shift amount Xs, to the distance Xw.

In order to measure the read offset profile, the data of the track TR is read for one cycle while changing the read offset correction amount Xc to each of the k read offset correction amounts Xc[0], Xc[1], Xc[2], . . . , and Xc[k−1], the quality (amplitude or bit error rate) of the read signal is measured, and thus the measurement can be achieved. The radial position PXr, which is the read target position at this time, can be determined from the information of the distance Xr.

A physical radial position Yr of the read head RHD can be obtained by reading and demodulating servo information on the disk DK. The subtractor SU1 outputs a positioning error e, which is information obtained by subtracting the physical radial position Yr from the distance Xr, to the controller CL (e=Xr−Yr). In order to achieve stable positioning control by the controller CL, the controller CL can obtain a controlled variable U by performing gain compensation and phase compensation on the positioning error e. By driving the actuator P using the controlled variable U as an input, the positioning control of the read head RHD to the read target position (radial position PXr) can be performed.

Figure 13:
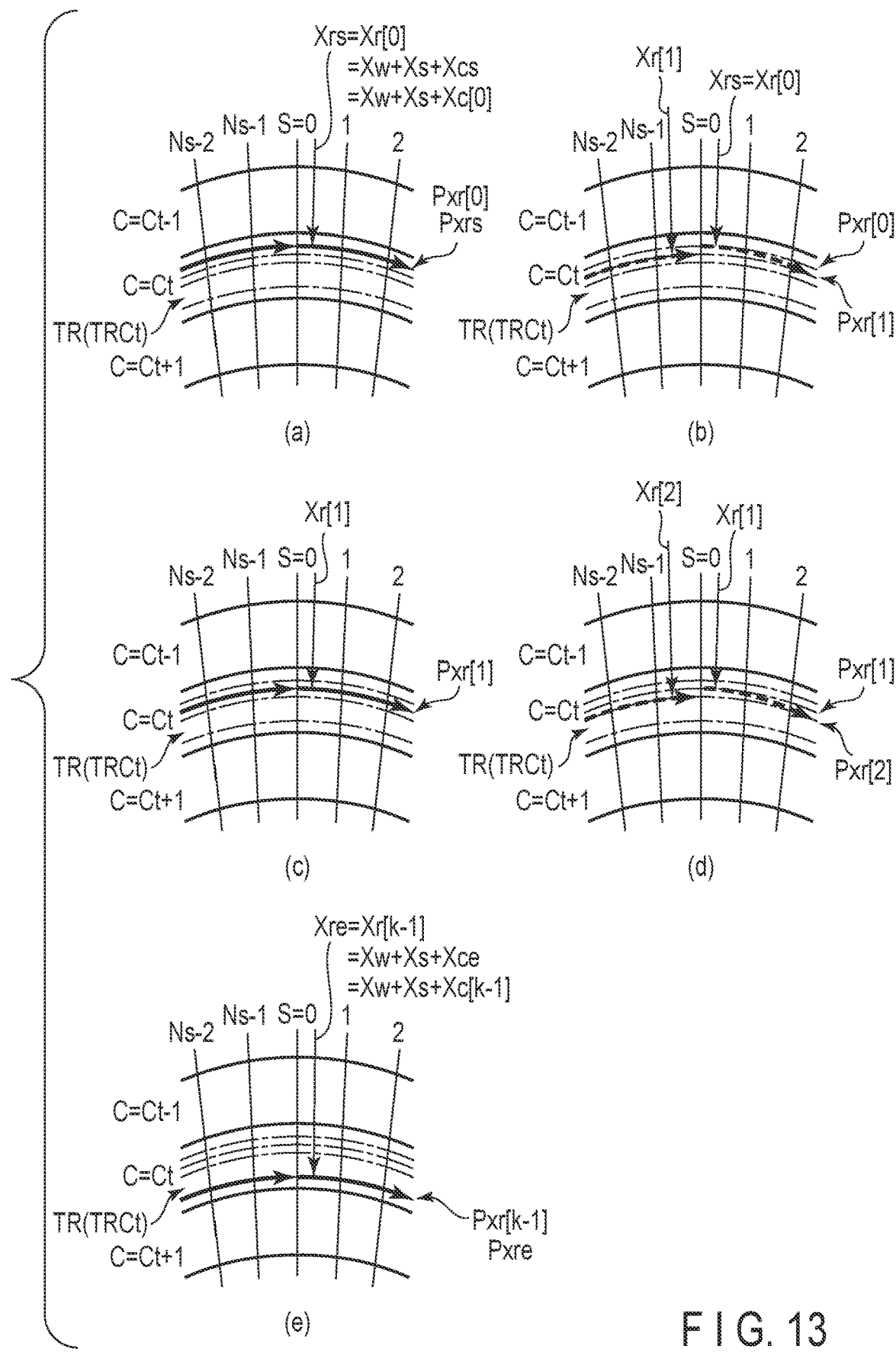
FIG. 13 is a diagram that describe the movement of the head when reading the data of a track while changing the read offset correction amount in the comparative example, (a) shows a state in which the read head is positioned to a first radial position and the data of the track is read, (b) shows a state in which the read head is moved to a second radial position, (c) shows a state in which the read head is positioned to the second radial position from the first radial position and the data of the track is read, (d) shows a state in which the read head is moved to a third radial position from the second radial position, and (e) shows a state in which the read head is positioned to a last radial position and the data of the track is read.

FIG. 13 is a diagram that describe the movement of the head HD when reading the data of the track TRCt while changing the read offset correction amount Xc in the present comparative example.

FIG. 13(a) shows a state in which the read head RHD is positioned to the first radial position and the data of the track TRCt is read, FIG. 13(b) shows a state in which the read head RHD is moved to the second radial position, FIG. 13(c) shows a state in which the read head RHD is positioned to the second radial position from the first radial position and the data of the track TRCt is read, FIG. 13(d) shows a state in which the read head RHD is moved to the third radial position from the second radial position, and FIG. 13(e) shows a state in which the read head RHD is positioned to the last radial position and the data of the track TRCt is read.

As shown in FIG. 13, the position and movement of the read head RHD on the disk DK when the amplitude or the bit error rate of the read signal is measured can be seen. In the radial direction d1, FIG. 13 shows three tracks TR of a track TRCt, and tracks TRCt−1 and TRCt+1 before and after the track TRCt. In the circumferential direction, FIG. 13 shows five sectors SCNs−2, SCNs−1, SC0, SC1, and SC2 having a sector number S of 0 and sector numbers Ns−2, Ns−1, 1, and 2 before and after the sector number S of 0.

In the track TRCt, the read head RHD sequentially moves to a radial positions PXr[i] by changing the read offset correction amount Xc[i] while changing a variable i sequentially to 0, 1, 2, . . . , k−1. The radial position PXr[i] is indicated by a concentric one-dot chain line.

As shown in FIG. 13(a), first, the variable i is set to 0, the read offset correction amount is fixed to Xc[0], the read processing is started from the sector SC0 of the track TRCt, the read processing is sequentially performed from the sector SC0, the sector SC1, and the sector SC2 as indicated by solid arrows, the read processing is performed up to the sector SCNs−1, and the read processing of reading the data of the track TRCt by one cycle is terminated.

The radial position PXrs, which is the radial position PXr at which the read head RHD is first positioned, is a position apart from the reference position by the distance Xr[0](Xr[0]=Xw+Xs+Xc[0]).

As shown in FIG. 13(b), subsequently, when the read processing is started at the radial position PXr[1], an offset seek operation from the radial position PXr[0] to the radial position PXr[1] has to be performed as indicated by a broken arrow. Therefore, the read processing is not immediately performed, and a seek operation and a standby operation (rotation waiting operation) are performed. Note that the broken-line arrows indicate both the seek operation and the standby operation. Here, the disk DK makes one rotation in the seek operation and the standby operation.

As shown in FIG. 13(c), after that, the read head RHD is positioned to the radial position PXr[1] as indicated by a solid arrow from the sector SC0 of the track TRCt, and the read processing is resumed.

After the processing, the read processing, the seek operation, and the standby operation are repeatedly performed until the variable i reaches k−1. After the read head RHD is positioned to the radial position PXr[k−1] and the read processing is performed, the reading of the data of the track TRCt ends.

The radial position PXre, which is a radial position PXr at which the read head RHD is lastly positioned, is a position apart from the reference position by a distance Xr[k−1](Xr[k−1]=Xw+Xs+Xc[k−1]).

By the above-described various operations, it is possible to obtain a more accurate profile of the amplitude of the signal or a more accurate profile of the bit error rate of the signal at the radial positions PXr[i] which are also the read positions.

Figure 14:
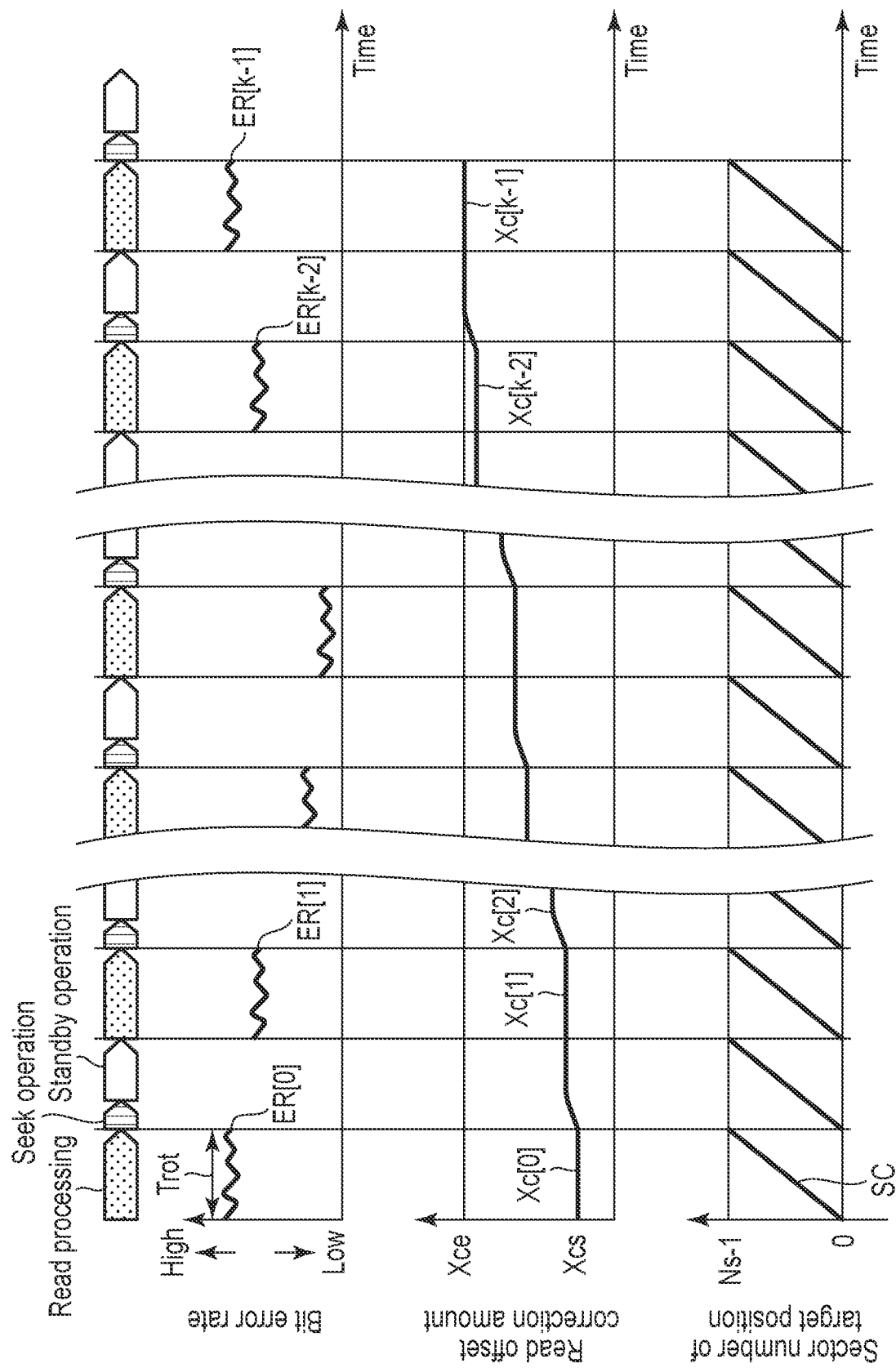
FIG. 14 is a graph showing changes in the bit error rate, changes in the read offset correction amount, and changes in the sector number of a target position in the case in which read processing, a seek operation, and a standby operation are repeatedly performed on a target track in the comparative example.

FIG. 14 is graphs showing changes in the bit error rate ER[i], changes in the read offset correction amount Xc[i], and changes in the sector number S at the target position in the case in which the read processing, the seek operation, and the standby operation are repeatedly performed on the target track TR in the present comparative example. The operation mode, the bit error rate ER of the measured signal, the read offset correction amount Xc, and the sector number S are shown from the top.

As shown in FIG. 14, the read offset correction amount is set to Xc[0], and in a period Trot in which the disk DK makes one rotation, the read channel 14R measures the bit error rate of the signal obtained by reading the data of the sector SC0 to the data of the sector SCNs−1 of the track TR.

The signal quality averaging processing unit 65 averages a plurality of bit error rates ER[0] obtained while the read offset correction amount is set to Xc[0], and derives an averaged bit error rate.

Subsequently, by changing the read offset correction amount from Xc[0] to Xc[1], a seek operation (offset seek) and a standby operation are performed. During the standby operation, the read channel 14R and the like are in an idle state.

In the subsequent read processing, the read offset correction amount is fixed to Xc[1], and in the period Trot in which the disk DK makes one rotation, the read channel 14R measures the bit error rate of the signal obtained by reading the data of the sector SC0 to the data of the sector SCNs−1 of the track TR.

The signal quality averaging processing unit 65 averages a plurality of bit error rates ER[1] obtained while the read offset correction amount is set to Xc[1], and derives an averaged bit error rate.

After that, by repeatedly performing the read processing, the seek operation, and the standby operation on the target track TR until the variable i reaches k−1, the acquisition of the averaged bit error rates is completed.

However, in the track center search method as shown in FIG. 14, it takes a time period of 2×k×Trot to obtain the profiles of the bit error rates at the radial positions PXr[i]. For example, in the magnetic disk device 1 of 7,200 rpm, the period Trot is 8.3 msec (Trot=8.3 msec). Furthermore, k=10. In order to perform the read processing at the 10 radial positions PXr and obtain the profile of the bit error rate, a time period of 166 msec is necessary (2×k×Trot=2×10×8.3 [msec]).

According to the magnetic disk device 1 thus configured and the method of searching for the appropriate read position PXropt, for example, when the time period for searching for the track center in the manufacturing process increases, the total time necessary for adjusting the magnetic disk device 1 at the time of manufacturing increases, which may cause an increase in manufacturing cost. Specifically, in the shingled write recording magnetic disk device 1, the radial position PXr to the radial position PXw greatly changes depending on the track pitch. Since the process of obtaining the appropriate read offset correction amount Xcopt (track center search) is necessary, the influence of the time period for obtaining the appropriate read offset correction amount Xcopt on the manufacturing period is large.

The track center may be searched not only before the actual use of the magnetic disk device 1 but also after the actual use of the magnetic disk device 1, and in this case, the time period necessary for searching for the track center is desirably short.

First Embodiment

Next, a configuration of a magnetic disk device 1 according to a first embodiment will be described. FIG. 15 is a block diagram showing a configuration of the magnetic disk device 1 according to the first embodiment. The magnetic disk device 1 is configured similarly to the magnetic disk device 1 of the comparative example except the configuration described in the first embodiment.

As shown in FIG. 15, an MPU 60 further includes a read position averaging processing unit 64. The configuration and function of the read position averaging processing unit 64 will be described later.

A read processing unit 61b can execute the first read processing of moving a read head RHD to n1 radial positions PXr shifted from each other in the radial direction d1 of a disk DK and reading the data of a track TR at each radial position PXr within a period in which the disk DK makes m1 rotations.

A read channel 14R can measure the quality of a plurality of first signals obtained by reading in the first read processing. Note that the quality of the first signal is the amplitude or bit error rate described above.

A comparison unit 62 can compare the qualities of the first signals obtained by the reading by the first read processing and derive the first signal of the highest quality from among the first signals.

A determination unit 63 can determine a radial position PXr (PXropt1) at which the first signal of the highest quality is derived among n1 radial positions PXr as a first appropriate read position PXropt1 appropriate for reading the data of the track TR.

In the first embodiment, the magnetic disk device 1 satisfies the relationship of the following Formula 1.

$$1 \leq m1 < n1 \qquad \text{Formula 1}$$

For example, the value m1 is 1 (m1=1). The value n1 corresponds to the value k and is, for example, 10 (n1=10). Since m1≥n1 is not satisfied, the first appropriate read position PXropt1 can be searched in a short time. In other words, it is possible to shorten the time period for obtaining the first appropriate read offset correction amount Xcopt1 (searching for the track center) from the above-described comparative example.

When reading the data of the track TR, the read processing unit 61b can read the data of the track TR at the first appropriate read position PXropt1 by moving the read head RHD to the first appropriate read position PXropt1.

The write processing unit 61a can execute write processing of moving the read head RHD to a standby position that is the radial position PXw and writing data to the track TR by the write head WHD.

In the case in which the first appropriate read position PXropt1 is a position offset from the standby position (radial position PXw) and the data of the track TR is read, the read processing unit 61b can move the read head RHD to the first appropriate read position PXropt1 offset from the standby position and read the data of the track TR at the first appropriate read position PXropt1.

On the other hand, in the case in which the first appropriate read position PXropt1 matches the standby position (radial position PXw) and the data of the track TR is read, the read processing unit 61b can move the read head RHD to the first appropriate read position PXropt1, which is the standby position, and read the data of the track TR at the first appropriate read position PXropt1.

As described above, in the case in which the data of the track TR is read, the offset correction may be performed as necessary from the time of the write processing to the track TR.

FIG. 16 is a diagram that describes the movement of the head HD when reading the data of a track TRCt while changing a read offset correction amount Xc[i] in the first embodiment, and is a diagram showing a state in which the data of the track TRCt is read while moving the read head RHD from a first radial position PXrs to a last radial position PXre.

As shown in FIG. 16, the position and movement of the read head RHD on the disk DK when the amplitude or the bit error rate of the read signal is measured can be seen. In the radial direction d1, similarly to FIG. 13, FIG. 16 shows three tracks TRCt−1, TRCt, and TRCt+1. In the circumferential direction, similarly to FIG. 13, FIG. 16 shows five sectors SCNs−2, SCNs−1, SC0, SC1, and SC2.

In the track TRCt, the read head RHD sequentially moves to a radial positions PXr[i] by changing the read offset correction amount Xc[i] while changing a variable i sequentially to 0, 1, 2, . . . , k−1. The radial position PXr[i] is indicated by a concentric one-dot chain line.

First, the variable i is set to 0, the read offset correction amount is set to Xc[0], and the read processing is started from a sector SC0 of the track TRCt. Subsequently, as indicated by a solid arrow, the read processing is sequentially performed while gradually increasing the read offset correction amount Xc at a constant ratio as the sector number S increases, the read offset correction amount Xc is set to Xce (Xc[k−1]), and the read processing is performed on the last sector SCNs−1. By performing the read processing in this manner, it is possible to measure all the qualities (e.g., the bit error rates) of the signals in the range from the radial position PXrs to the radial position PXre in a period in which the disk DK makes one rotation.

For example, in the case in which the number of sectors SC of the track TRCt (the value k) is 500, the quality of the signal can be measured at 500 points within the range from the radial position PXrs to the radial position PXre. Also in the operation example of FIG. 16, the magnetic disk device 1 satisfies the relationship of Formula (1≤m1<n1) described above.

Note that the timing at which the read offset correction amount Xc is set to Xce (Xc[k−1]) is not limited to the timing at which the read processing is performed on the sector SCNs−1, and various modifications can be made. For example, the timing at which the read offset correction amount Xc is set to Xce (Xc[k−1]) may be the timing at which the read processing is performed on the sector SCNs−4.

In addition, the read channel 14R may not measure the quality of the signal read for each sector SC. For example, the read channel 14R may measure the quality of signals read in every multiple sectors SC.

Figure 17:
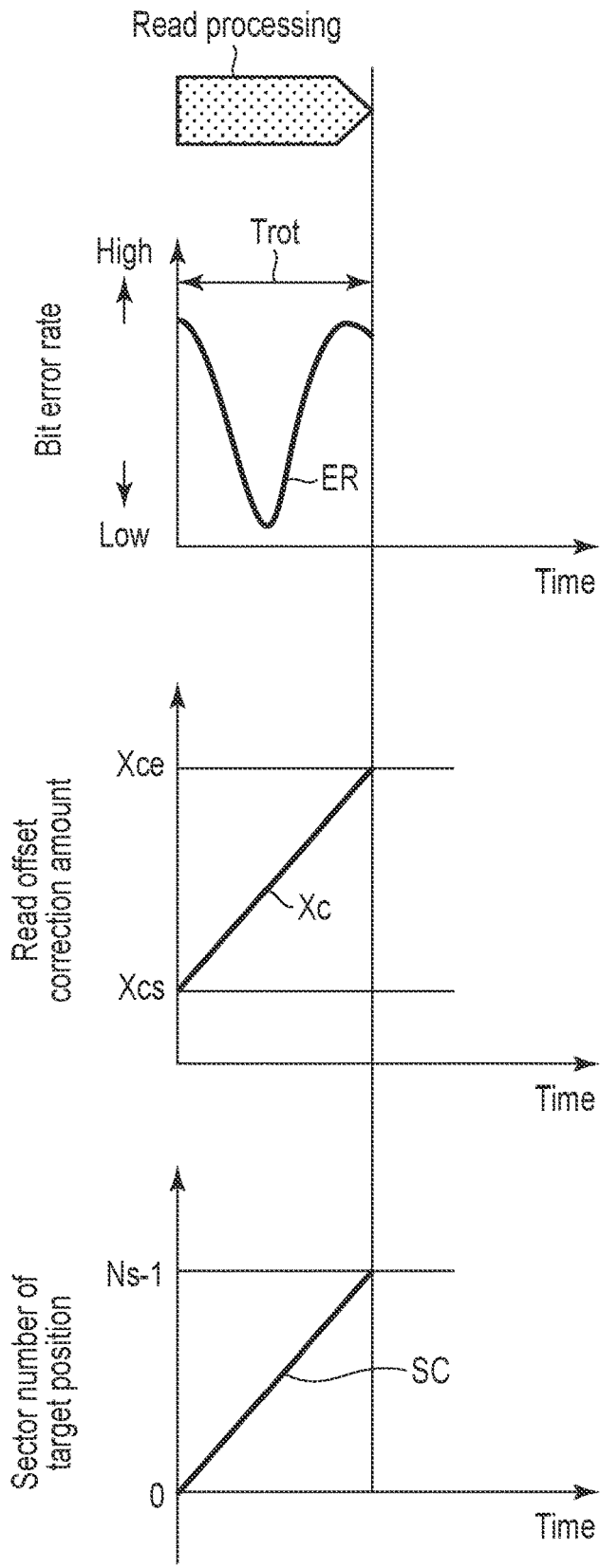
FIG. 17 is graphs showing changes in the bit error rate, changes in the read offset correction amount, and changes in the sector number of a target position in the case in which read processing is performed on a target track in the first embodiment.

FIG. 17 is graphs showing changes in the bit error rate ER[i], changes in the read offset correction amount Xc[i], and changes in the sector number S at the target position in the case in which the read processing is performed on the target track TRCt in the first embodiment. FIG. 17 corresponds to FIG. 14 of the comparative example.

As shown in FIG. 17, the radial position PXr[i] changes from the radial position PXrs to the radial position PXre as the read processing is performed while shifting the target sector SC in the traveling direction d2 from the sector SC0, the sector SC1, and the sector SC2. Therefore, the profile of the quality (bit error rate) of the read signal can be acquired in the period Trot in which the disk DK makes one rotation.

Figure 18:
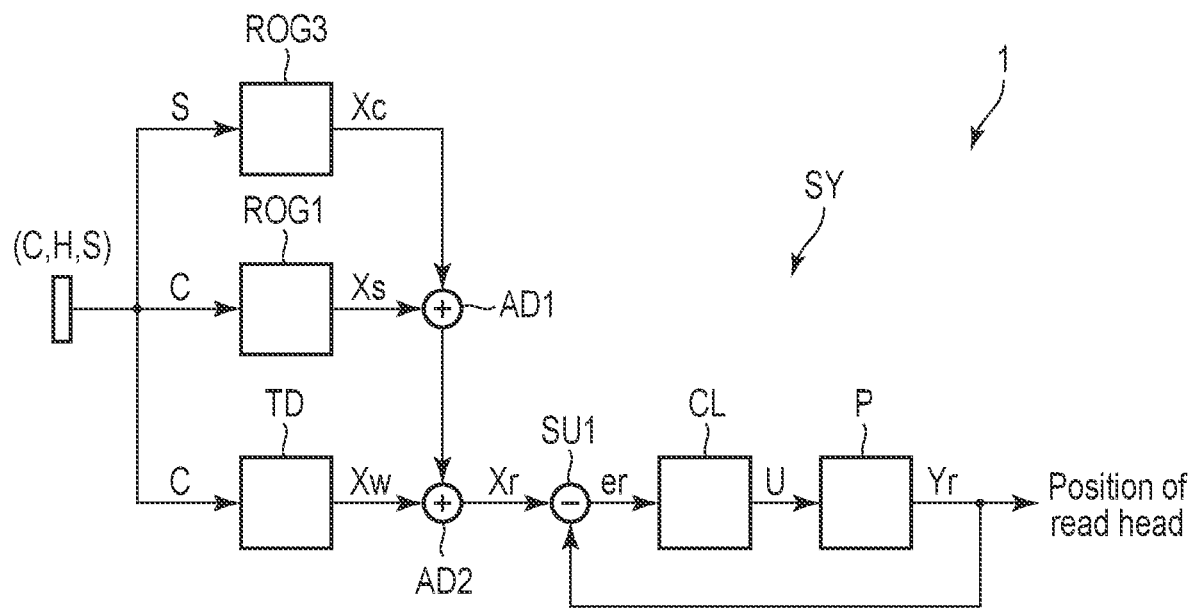
FIG. 18 is a block diagram showing an example of a positioning control system of a head according to the first embodiment.

FIG. 18 is a block diagram showing an example of a positioning control system SY of the head HD according to the first embodiment.

As shown in FIG. 18, the positioning control system SY includes a generator (Read Offset Generator) ROG3 instead of the generator ROG2. Information of the sector number S of the read target sector SC is input to the generator ROG3. The generator ROG3 converts the information into the read offset correction amount Xc based on the sector number S and outputs the read offset correction amount Xc.

For example, the read offset correction amount Xc depends on the sector number S alone. In this case, the read offset correction amount Xc for the sector SC0 of the track TR0 and the read offset correction amount Xc for the sector SC0 of the track TRNc−1 are equal.

Figure 19:
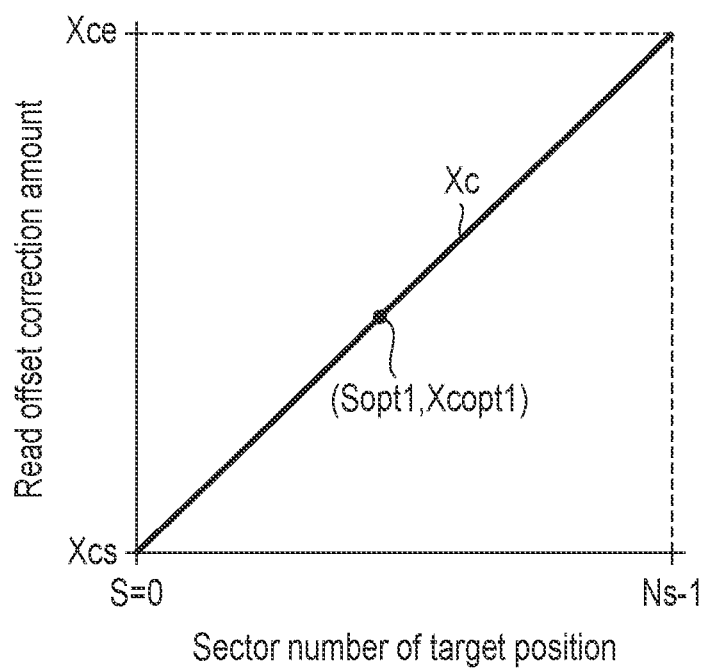
FIG. 19 is a graph showing changes in the read offset correction amount to the position (radial position) of the target sector in the first embodiment, and is a graph showing an example in which the read offset correction amount is changed in a linear trajectory.

FIG. 19 is a graph showing changes in the read offset correction amount Xc to the position (radial position) of the target sector SC in the first embodiment, and is a graph showing an example in which the read offset correction amount Xc is changed in a linear trajectory. The read offset correction amount Xc in FIG. 19 can be obtained by calculation. However, the read offset correction amount Xc may not be obtained by calculation. In this case, a memory such as a nonvolatile memory 90 may have a table having information of the read offset correction amount Xc.

As shown in FIG. 19, when executing the first read processing, the read processing unit 61b seeks the read head RHD in the first seek direction (substantially inward direction in this example) at a uniform velocity. The n1 radial positions PXr are provided at equal intervals in the radial direction d1. When the first read processing is executed, the read processing unit 61b can read the data of the track TR at regular time intervals.

In a period during which the disk DK makes one rotation, the read offset correction amount Xc linearly changes (increases). The read offset correction amount Xc at the time of reading the data of the sector SC0 is Xcs (Xc[0]), and the read offset correction amount Xc at the time of reading the data of the sector SCNs−1 is Xce (Xc[k−1]).

From the profile of the bit error rate of the signal obtained by reading the data of the track TR by one cycle, it is possible to obtain Sopt1, which is the sector number S, and the first appropriate read offset correction amount Xcopt1, which is the read offset correction amount Xc when the bit error rate becomes smallest. However, the sector number Sopt1 and the first appropriate read offset correction amount Xcopt1 are desirably values when the bit error rate becomes minimum.

Figure 20:
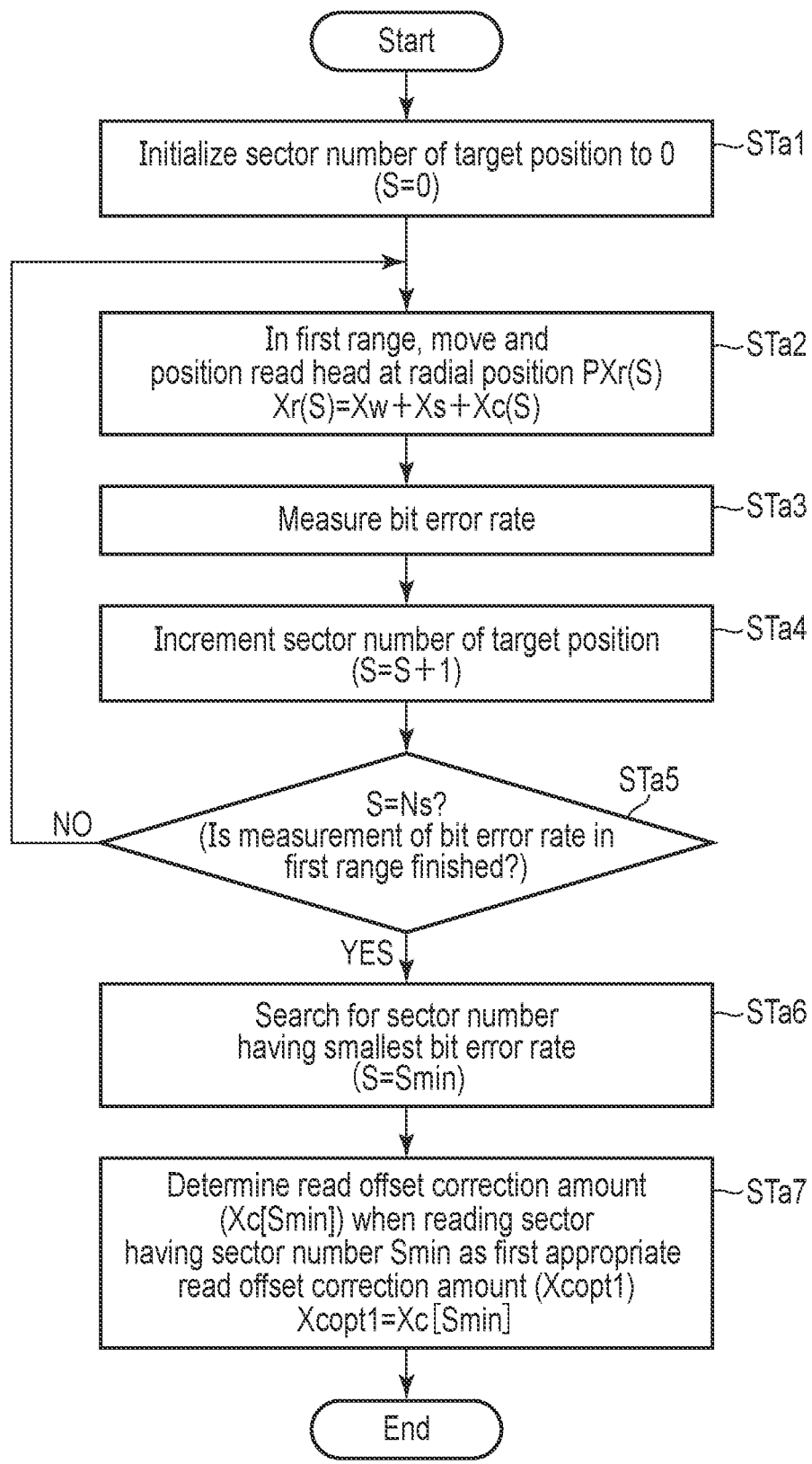
FIG. 20 is a flowchart that describes a method of searching for a first appropriate read offset correction amount applicable to the magnetic disk device of the first embodiment.

FIG. 20 is a flowchart that describes a method of searching for the first appropriate read offset correction amount Xcopt1 applicable to the magnetic disk device 1 of the first embodiment.

As shown in FIG. 20, when the method of searching for the first appropriate read offset correction amount Xcopt1 for the track TR is started, first, in Step STa1, the read processing unit 61b initializes the sector number S at the target position to 0 (S=0).

Subsequently, in Step STa2, in accordance with the read offset correction amount Xc (S) obtained from the generator ROG3, the read processing unit 61b moves and positions the read head RHD to the radial position PXr(S) within a first range, and then in Step STa3, the read channel 14R measures the bit error rate ER(S).

The radial position PXr(S) is a position apart from the reference position by a distance Xr(S) (Xr(S)=Xw+Xs+Xc (S)). The first range is a range having a width in the radial direction d1, ranging from the radial position PXrs to the radial position PXre.

After that, in Step STa4, the read processing unit 61b increments the sector number S at the target position. Subsequently, in Step STa5, the read processing unit 61b determines whether the sector number S at the target position exceeds the last sector number Ns−1. In the case in which the sector number S does not exceed the sector number Ns−1 (S≤Ns−1), the process proceeds to Step STa2, and the processes of steps STa2 to STa5 are repeatedly executed.

On the other hand, in the case in which it is determined in Step STa5 that the sector number S at the target position exceeds the sector number Ns−1 (S=Ns), the measurement of the bit error rate ER within the first range is finished, and the process proceeds to Step STa6. In Step STa6, the comparison unit 62 compares the bit error rates ER of the first signals obtained by the reading in the first read processing, and derives the first signal having the smallest (desirably minimum) bit error rate ER from among the first signals. Then, Smin, which is the sector number S when the first signal having the smallest bit error rate ER is derived, can be searched.

Next, in Step STa7, the determination unit 63 determines the read offset correction amount Xc[Smin] when the sector SCmin having the sector number S of Smin is read as the first appropriate read offset correction amount Xcopt1 (Xcopt1=Xc[Smin]). Accordingly, the method of searching for the first appropriate read offset correction amount Xcopt1 for the track TR is ended.

According to the magnetic disk device 1 and the method of searching for the first appropriate read position PXropt1 according to the first embodiment thus configured, the magnetic disk device 1 includes the disk DK having the track TR in a recording layer L, the read head RHD, and the MPU 60. The MPU 60 includes the read processing unit 61b, the comparison unit 62, and the determination unit 63.

A read processing unit 61b can execute the first read processing of moving a read head RHD to n1 radial positions PXr shifted from each other in the radial direction d1 of a disk DK and reading the data of a track TR at each radial position PXr within a period in which the disk DK makes m1 rotations.

A comparison unit 62 can compare the qualities of the first signals obtained by the reading by the first read processing and derive the first signal of the highest quality from among the first signals.

A determination unit 63 can determine a radial position PXr (PXropt1) at which the first signal of the highest quality is derived among n1 radial positions PXr as a first appropriate read position PXropt1 appropriate for reading the data of the track TR.

1≤m1<n1. Therefore, in the first embodiment, it is possible to search for the first appropriate read position PXropt1 in a short time, and it is possible to shorten the time period for obtaining the first appropriate read offset correction amount Xcopt1 (searching the track center).

Modification 1 of First Embodiment

Figure 21:
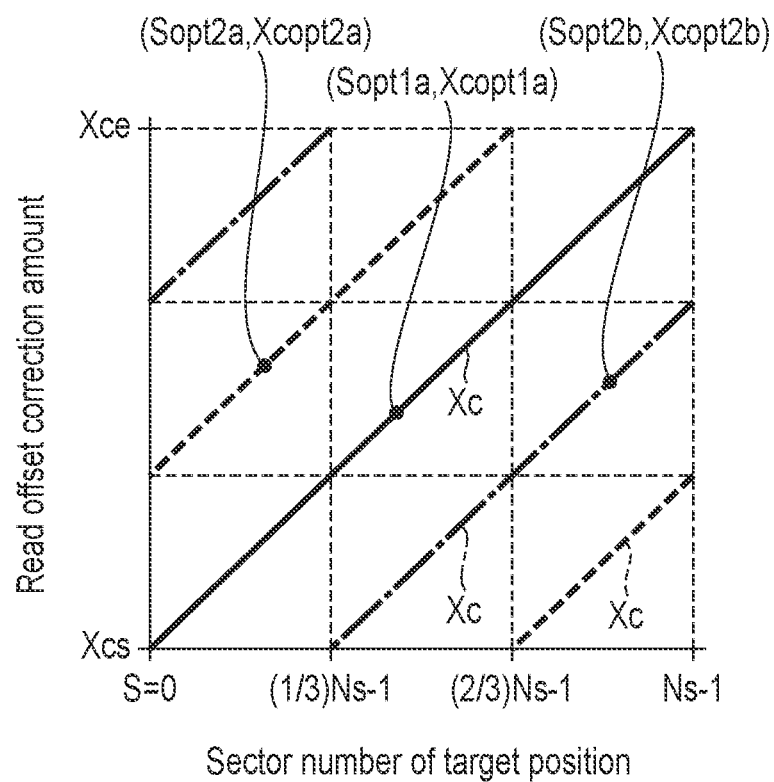
FIG. 21 is a view showing changes in the read offset correction amount to the position (radial position) of the target sector by three types of graphs in Modification 1 of the first embodiment, and is a view showing an example in which the read start position is shifted three times in the circumferential direction, and the read offset correction amounts are changed on the same linear trajectory.

Next, a configuration of a magnetic disk device 1 according to Modification 1 of the first embodiment will be described. FIG. 21 is a diagram showing changes in the read offset correction amount Xc to the position (radial position) of the target sector SC by three types of graphs in Modification 1, and is a diagram showing an example in which the read start position is shifted three times in the circumferential direction and the read offset correction amounts Xc are changed on the same linear trajectory. FIG. 22 is graphs showing changes in the bit error rate ER, changes in the read offset correction amount Xc, and changes in the sector number of the target position in the case in which the read processing, the seek operation, and the standby operation are repeatedly performed on the target track TR in Modification 1.

The magnetic disk device 1 is configured similarly to the magnetic disk device 1 of the first embodiment except the configuration described in Modification 1. In Modification 1, the appropriate read position PXropt can be searched in a short time, and the sector dependency of the bit error rate can be averaged.

As shown in FIGS. 21 and 22, the read processing unit 61b performs the first read processing similarly to the first embodiment (FIG. 19). In the first read processing, the read processing unit 61b first reads the data of the sector SC0 with the read offset correction amount Xc as Xcs (Xc[0]), and lastly reads the data of the sector SCNs−1 with the read offset correction amount Xc as Xce (Xc[k−1]).

From the profile of the bit error rate of the signal obtained by reading the data of the track TR by one cycle, it is possible to obtain Sopt1, which is the sector number S, and the first appropriate read offset correction amount Xcopt1, which is the read offset correction amount Xc when the bit error rate becomes smallest.

The read processing unit 61b sequentially executes a seek operation, a rotation waiting operation, and second read processing following the first read processing. The second read processing is the processing of seeking the read head RHD in the first seek direction within a period in which the disk DK rotates m2 times, similarly to the first read processing, moving the read head RHD to n2 radial positions PXr shifted from each other in the radial direction d1, and reading the data of the track TR at each radial position PXr.

In Modification 1, the magnetic disk device 1 satisfies the relationship of the following Formula 2.

$$1 \leq m2 < n2 \qquad \text{Formula 2}$$

The operation of seeking the read head RHD during the second read processing is the same as the operation of seeking the read head RHD during the first read processing. In Modification 1, n1=n2 and m1=m2.

In the second read processing, the read processing unit 61b first reads the data of the sector SC{(2/3) (Ns−1)} with the read offset correction amount Xc as Xcs (Xc[0]), and lastly reads the data of the sector SC{(2/3) (Ns−1)−1} with the read offset correction amount Xc as Xce (Xc[k−1]).

The position (sector SC0) at which the data of the track TR is first read in the first read processing and the position (sector SC{(2/3) (Ns−1)}) at which the data of the track TR is first read in the second read processing are shifted from each other in the circumferential direction. As described above, it is shown that the read offset correction amount Xc is changed in the same linear trajectory in each of the first read processing and the second read processing.

The comparison unit 62 can further compare the qualities of a plurality of second signals obtained by the reading by the second read processing and derive the second signal of the highest quality from among the second signals.

The determination unit 63 can further determine the radial position PXr at the time of deriving the second signal of the highest quality among the n2 radial positions PXr as a second appropriate read position PXropt2a appropriate for reading the data of the track TR.

For example, from the profile of the bit error rate of the signal obtained by reading the data of the track TR by one cycle in the second read processing, it is possible to obtain Sopt2a, which is the sector number S, and the second appropriate read offset correction amount Xcopt2a, which is the read offset correction amount Xc, when the bit error rate becomes smallest.

The read position averaging processing unit 64 can derive an averaging position that is a position obtained by averaging the first appropriate read position PXropt1 and the second appropriate read position PXropt2a in the radial direction d1. As a result, when reading the data of the track TR, the read processing unit 61b can move the read head RHD to the averaging position and read the data of the track TR at the averaging position. The read processing can be easily performed by positioning the read head RHD at the appropriate radial position PXr as compared with the first embodiment, and a signal of higher quality can be easily obtained by the read processing.

The number of times of read processing for one track is not limited to two, and may be three or more. In Modification 1, the read processing including the first read processing and the second read processing is performed three times.

The read processing unit 61b sequentially executes a seek operation, a rotation waiting operation, and third read processing following the second read processing. The third read processing is the processing of seeking the read head RHD in the first seek direction within a period in which the disk DK makes m rotations (e.g., m2 rotations), similarly to the second read processing, moving the read head RHD to n (e.g., n2) radial positions PXr shifted from each other in the radial direction d1, and reading the data of the track TR at each radial position PXr (1≤m<n).

The operation of seeking the read head RHD during the third read processing is the same as the operation of seeking the read head RHD during the first read processing and the second read processing.

In the third read processing, the read processing unit 61b first reads the data of the sector SC{(1/3) (Ns−1)} with the read offset correction amount Xc as Xcs (Xc[0]), and lastly reads the data of the sector SC{(1/3) (Ns−1)−1} with the read offset correction amount Xc as Xce (Xc[k−1]).

The position (sector SC0) at which the data of the track TR is first read in the first read processing, the position (sector SC{(2/3) (Ns−1)}) at which the data of the track TR is first read in the second read processing, and the position (sector SC{(1/3) (Ns−1)}) at which the data of the track TR is first read in the third read processing are shifted from each other in the circumferential direction. As described above, it is shown that the read offset correction amount Xc is changed in the same linear trajectory in each of the first read processing, the second read processing, and the third read processing.

The comparison unit 62 can further compare the qualities of third signals obtained by the reading by the third read processing, and derive the third signal of the highest quality from among the third signals.

The determination unit 63 can further determine the radial position PXr at the time of deriving the third signal of the highest quality among the n radial positions PXr as a third appropriate read position PXropt2b appropriate for reading the data of the track TR.

For example, from the profile of the bit error rate of the signal obtained by reading the data of the track TR by one cycle in the third read processing, it is possible to obtain Sopt2b, which is the sector number S, and a third appropriate read offset correction amount Xcopt2b, which is the read offset correction amount Xc, when the bit error rate becomes smallest.

The read position averaging processing unit 64 can derive an averaging position that is a position obtained by averaging the first appropriate read position PXropt1, the second appropriate read position PXropt2a, and the third appropriate read position PXropt2b in the radial direction d1. Since the profiles of the bit error rates for three systems can be acquired, the appropriate read offset correction amount Xcopt (the appropriate read position PXropt) from which the sector number dependency is removed can be obtained.

As a result, when reading the data of the track TR, the read processing unit 61b can move the read head RHD to the averaging position and read the data of the track TR at the averaging position. The read processing can be easily performed by positioning the read head RHD at the appropriate radial position PXr as compared with the first embodiment, and a signal of higher quality can be easily obtained by the read processing.

The sectors SC0, SC{(1/3) (Ns−1)}, and SC{(2/3) (Ns−1)} are provided at equal intervals in the circumferential direction. There may be the case in which the total number Ns of the sectors SC of the track TR is not possible to be divided by 3. In this case, in the second read processing, the read processing unit 61b only has to first read the data of the sector SC having the sector number S having an integer value close to the numerical value of {(2/3) (Ns−1)}, and in the third read processing, the read processing unit 61b only has to first read the data of the sector SC having the sector number S having an integer value close to the numerical value of {(1/3) (Ns−1)}.

Note that although different from Modification 1, the read processing may be performed four or more times while the read start position is shifted in the circumferential direction. Since the number of systems of the profile of the bit error rate can be increased, the effect of averaging the appropriate read positions PXropt can be improved. However, note that the time period for searching for the appropriate read position PXropt increases as the number of times of the read processing performed on one track TR increases.

Also in Modification 1, the same effects as those of the first embodiment can be obtained. In addition, since the read processing can be performed a plurality of times by shifting the measurement position in the circumferential direction, it is possible to average the sector dependency of the quality of the signal.

Modification 2 of First Embodiment

Next, a configuration of a magnetic disk device 1 according to Modification 2 of the first embodiment will be described. FIG. 23 is graphs showing changes in the bit error rate ER, changes in the read offset correction amount Xc, and changes in the sector number S at the target position in the case in which the read processing performed on the target track TR while moving the read head RHD in the linear trajectory in the first seek direction during one rotation of the disk DK and the read processing performed on the target track TR while moving the read head RHD in the linear trajectory in the second seek direction during one rotation of the disk DK are repeatedly performed in Modification 2.

The magnetic disk device 1 is configured similarly to the magnetic disk device 1 of the first embodiment except the configuration described in Modification 2. In Modification 2, it is possible to search for the appropriate read position PXropt in a short time, it is possible to continuously perform the read processing a plurality of times without the standby operation, and it is possible to improve the effect of averaging the appropriate read positions PXropt.

As shown in FIG. 23, the read processing unit 61b performs the first read processing similarly to the first embodiment (FIG. 19). In the first read processing, the read processing unit 61b first reads the data of the sector SC0 with the read offset correction amount Xc as Xcs (Xc[0]), and lastly reads the data of the sector SCNs−1 with the read offset correction amount Xc as Xce (Xc[k−1]).

From the profile of the bit error rate of the signal obtained by reading the data of the track TR by one cycle, it is possible to obtain Sopt1, which is the sector number S, and the first appropriate read offset correction amount Xcopt1, which is the read offset correction amount Xc when the bit error rate becomes smallest.

The read processing unit 61b can execute the second read processing after the first read processing. In Modification 2, the read processing unit 61b executes the second read processing, the third read processing, and the read processing a plurality of times following the first read processing. The second read processing is the processing of seeking the read head RHD at a uniform velocity in the second seek direction (substantially outward direction in this example) opposite to the first seek direction, moving the read head RHD to n2 radial positions shifted from each other in the radial direction d1, and reading the data of the track TR at each radial position PXr in a period in which the disk DK rotates m2 times.

In Modification 2, the magnetic disk device 1 satisfies the relationship of the above formula 2 (1≤m2<n2).

The operation of seeking the read head RHD during the second read processing is the same as the operation during the first read processing except that the seek direction is the second seek direction. In Modification 2, n1=n2 and m1=m2.

In the second read processing, the read processing unit 61b first reads the data of the sector SC0 with the read offset correction amount Xc as Xce (Xc[k−1]), and lastly reads the data of the sector SCNs−1 with the read offset correction amount Xc as Xcs (Xc[0]).

From the above, the range in the radial direction d1 measured in the second read processing is the same as the range in the radial direction d1 measured in the first read processing. That is, the radial position PXr at which the data of the track TR is read last in the first read processing and the radial position PXr at which the data of the track TR is read first in the second read processing are the radial position PXre and are matched. The radial position PXr at which the data of the track TR is read first in the first read processing and the radial position PXr at which the data of the track TR is read last in the second read processing are the radial position PXrs and are matched.

Unlike Modification 1, the second read processing can be performed following the first read processing without interposing the seek operation and the standby operation. The radial position PXr at which the read head RHD is moved does not change discontinuously. Since the measurement of the quality (e.g., the bit error rate) of the signal obtained by reading the data of the track TR can be continuously performed instead of intermittently, the measurement of the quality can be performed a plurality of times in a short time.

The comparison unit 62 can further compare the qualities of a plurality of second signals obtained by the reading by the second read processing and derive the second signal of the highest quality from among the second signals.

The determination unit 63 can further determine the radial position PXr at the time of deriving the second signal of the highest quality among the n2 radial positions PXr as a second appropriate read position PXropt2a appropriate for reading the data of the track TR.

The read position averaging processing unit 64 can derive an averaging position that is a position obtained by averaging the first appropriate read position PXropt1 and the second appropriate read position PXropt2a in the radial direction d1. As a result, when reading the data of the track TR, the read processing unit 61b can move the read head RHD to the averaging position and read the data of the track TR at the averaging position. The read processing can be easily performed by positioning the read head RHD at the appropriate radial position PXr as compared with the first embodiment, and a signal of higher quality can be easily obtained by the read processing.

The number of times of read processing for one track is not limited to two, and may be three or more. In Modification 2, the read processing including the first read processing and the second read processing is performed six times.

The time period during which each read processing is performed is not limited to the period Trot during which the disk DK makes one rotation, and may be less than the period Trot or may exceed the period Trot.

Furthermore, the time periods during which each read processing is performed match each other, but may be different from each other.

Also in Modification 2, the same effects as those of the first embodiment can be obtained. In addition, since the number of systems of the profile of the bit error rate can be increased, it is possible to improve the effect of averaging the appropriate read positions PXropt.

Modification 3 of First Embodiment

Next, a configuration of a magnetic disk device 1 according to Modification 3 of the first embodiment will be described. FIG. 24 is a graph showing changes in the read offset correction amount Xc to the position (radial position PXr) of the target sector SC in Modification 3, and is a graph showing an example in which the read offset correction amount Xc is changed in a linear trajectory right-upward and then the read offset correction amount Xc is changed in a linear trajectory right-downward in a period in which the disk DK makes one rotation. The magnetic disk device 1 is configured similarly to the magnetic disk device 1 of Modification 2 except the configuration described in Modification 3.

As shown in FIG. 24, in the period Trot in which the disk DK makes one rotation, both the first read processing performed by seeking the read head RHD at a uniform velocity in the first seek direction and the second read processing performed by seeking the read head RHD at a uniform velocity in the second seek direction may be performed. The read head RHD is reciprocated between the radial position PXrs and the radial position PXre.

From the profile of the bit error rate of the signal obtained in the first read processing performed in the period in which the disk DK rotates ½ for the first time, the sector number Sopt1 and the first appropriate read offset correction amount Xcopt1 when the bit error rate becomes smallest can be obtained. From the profile of the bit error rate of the signal obtained in the second read processing performed during the remaining ½ rotation period of the disk DK, the sector number Sopt2a and the second appropriate read offset correction amount Xcopt2a when the bit error rate becomes smallest can be obtained.

Also in Modification 3, the same effects as those of the first embodiment can be obtained. In addition, it is possible to obtain the appropriate read offset correction amount Xcopt (the appropriate read position PXropt) a plurality of times in a short time.

Modification 4 of First Embodiment

Figure 25:
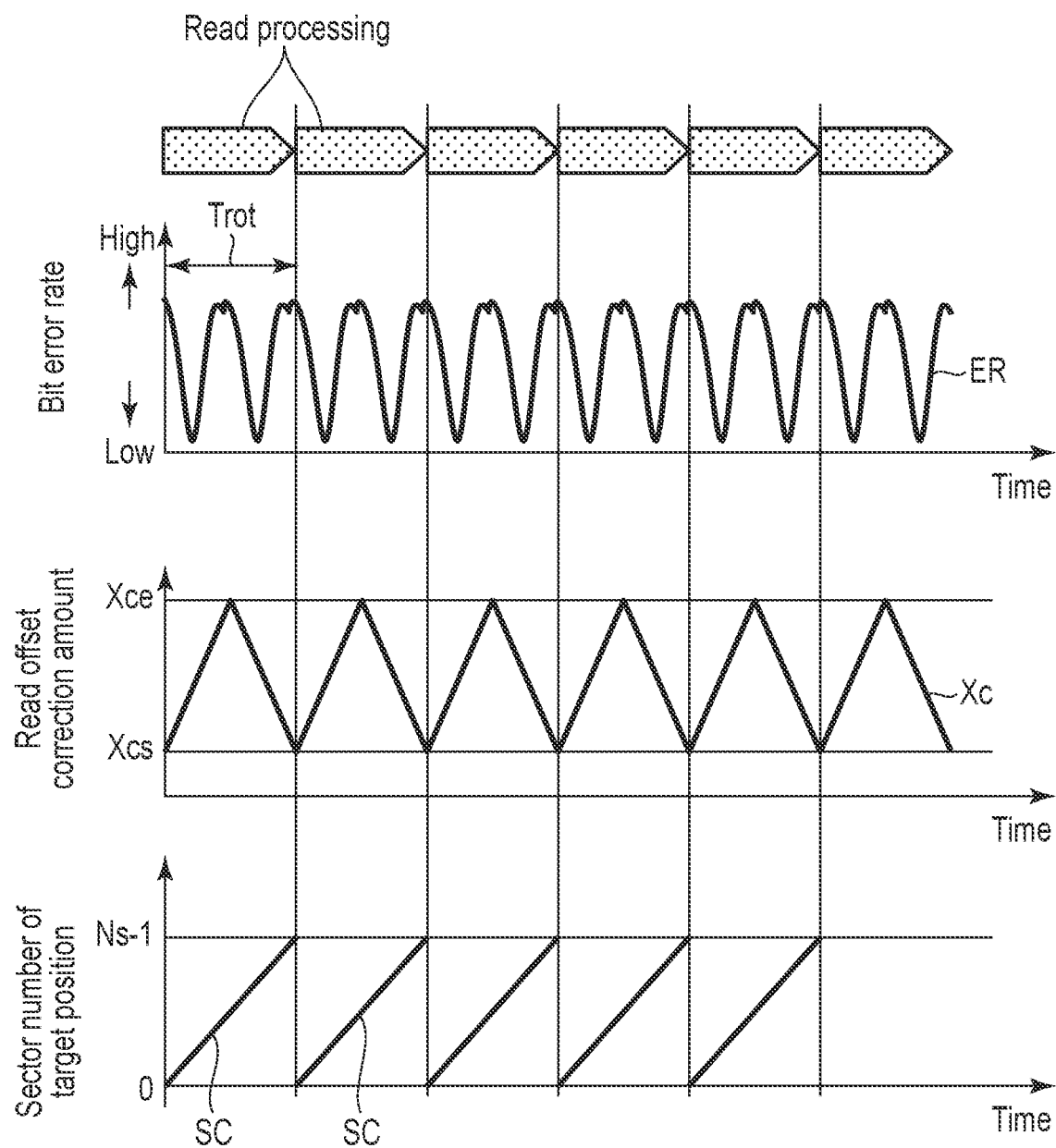
FIG. 25 is graphs showing changes in the bit error rate, changes in the read offset correction amount, and changes in the sector number at a target position in the case in which read processing performed on a target track while moving the read head in a linear trajectory in the first seek direction and read processing performed on the target track while continuously moving the read head in a linear trajectory in the second seek direction are repeatedly performed in a period in which the disk makes one rotation in Modification 4 of the first embodiment.

Next, a configuration of a magnetic disk device 1 according to Modification 4 of the first embodiment will be described. FIG. 25 is graphs showing changes in the bit error rate, changes in the read offset correction amount Xc, and changes in the sector number of the target position in the case in which the read processing performed on the target track TR while moving the read head RHD in the linear trajectory in the first seek direction and the read processing performed on the target track while moving the read head in the linear trajectory in the second seek direction are repeatedly performed in a period in which the disk DK makes one rotation in Modification 4. The magnetic disk device 1 is configured similarly to the magnetic disk device 1 of Modification 2 except the configuration described in Modification 4.

As shown in FIG. 25, the technology of Modification 4 corresponds to a combination of the technology of Modification 2 (FIG. 23) and the technology of Modification 3 (FIG. 24). In the period Trot in which the disk DK makes one rotation, both the first read processing performed by seeking the read head RHD at a uniform velocity in the first seek direction and the second read processing performed by seeking the read head RHD at a uniform velocity in the second seek direction are performed. Furthermore, the number of times of the read processing for one track TR is three times or more, for example, 12 times (six reciprocations).

Also in Modification 4, the same effects as those of Modification 2 and Modification 3 can be obtained.

Modification 5 of First Embodiment

Figure 26:
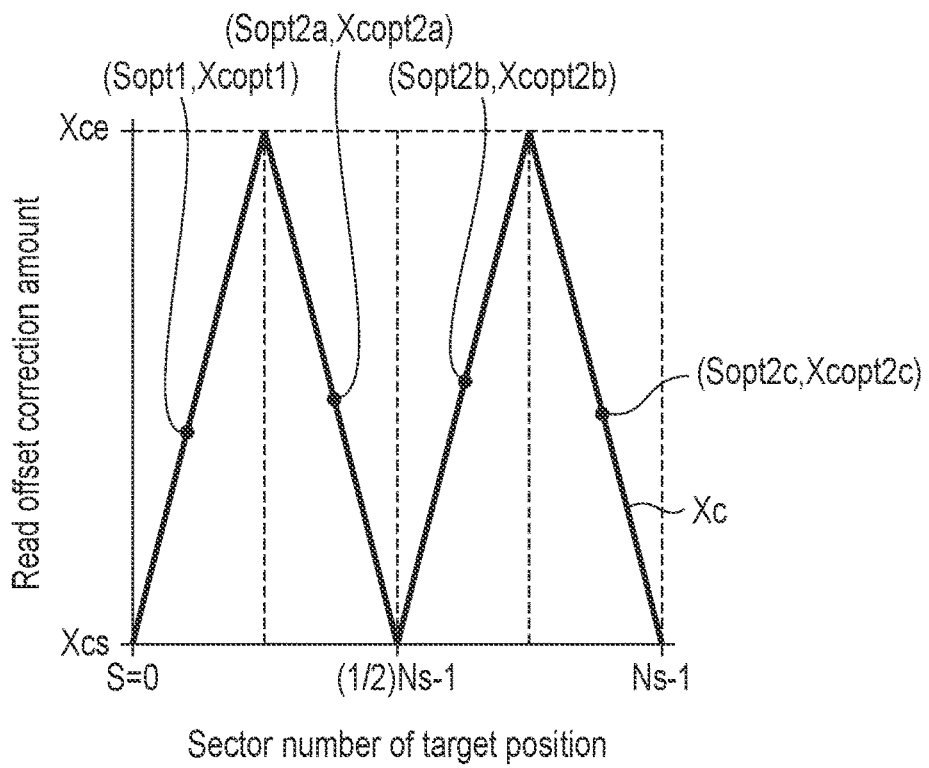
FIG. 26 is a graph showing changes in the read offset correction amount to a position (radial position) of a target sector in Modification 5 of the first embodiment, and is a graph showing an example in which the read offset correction amount is changed in a linear trajectory right-upward, the read offset correction amount is changed in a linear trajectory right-downward, the read offset correction amount is changed in a linear trajectory right-upward, and the read offset correction amount is changed in a linear trajectory right-downward in a period in which the disk makes one rotation.

Next, a configuration of a magnetic disk device 1 according to Modification 5 of the first embodiment will be described. FIG. 26 is a graph showing changes in the read offset correction amount Xc to the position (radial position PXr) of the target sector SC in Modification 5, and is a diagram showing an example in which the read offset correction amount Xc is changed in a linear trajectory right-upward, the read offset correction amount Xc is changed in a linear trajectory right-downward, the read offset correction amount Xc is changed in a linear trajectory right-upward, and the read offset correction amount Xc is changed in a linear trajectory right-downward in a period in which the disk DK makes one rotation. The magnetic disk device 1 is configured similarly to the magnetic disk device 1 of Modification 3 except the configuration described in Modification 5.

As shown in FIG. 26, the read processing may be performed three or more times during the period Trot in which the disk DK makes one rotation. In Modification 5, the read processing is performed four times (two reciprocations).

Also in Modification 5, it is possible to obtain the same effects as those of Modification 3.

Modification 6 of First Embodiment

Figure 27:
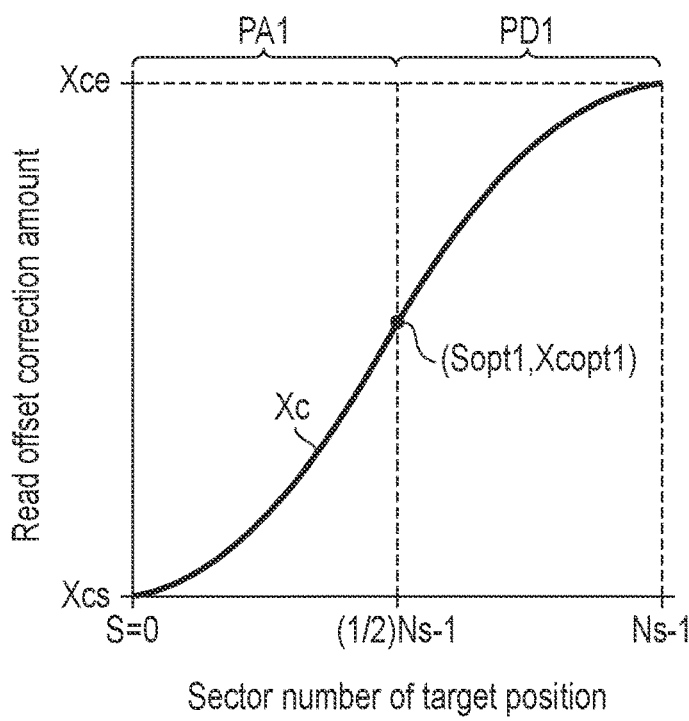
FIG. 27 is a graph showing changes in the read offset correction amount to a position (radial position) of a target sector in Modification 6 of the first embodiment, and is a graph showing an example in which the read offset correction amount is changed on a sinusoidal trajectory.

Next, a configuration of a magnetic disk device 1 according to Modification 6 of the first embodiment will be described. FIG. 27 is a graph showing changes in the read offset correction amount Xc to the position (radial position PXr) of the target sector SC in Modification 6, and is a graph showing an example in which the read offset correction amount Xc is changed on a sinusoidal trajectory. The magnetic disk device 1 is configured similarly to the magnetic disk device 1 of the first embodiment except the configuration described in Modification 6.

As shown in FIG. 27, when the first read processing is executed, the read processing unit 61*b* seeks the read head RHD in the first seek direction (the inward direction in this example), but does not seek the read head RHD at a uniform velocity. The period in which the first read processing is executed includes a first acceleration period PA1 that is a first period and a first deceleration period PD1 that is a last period. The read processing unit 61*b* seeks the read head RHD while gradually increasing the speed in the first seek direction in the first acceleration period PA1. The read processing unit 61*b* seeks the read head RHD while gradually decreasing the speed in the first seek direction in the first deceleration period PD1.

In Modification 6, the read head RHD is not sought at a uniform velocity, but the read head RHD is sought with ease-in-out. Since it is possible to suppress a rapid change in the speed of the read head RHD at the time of seeking, it is possible to reduce the risk of exciting the resonance frequency of the mechanism system.

In Modification 6, n1 radial positions PXr are provided at equal intervals in the radial direction d1. Therefore, the read processing unit 61*b* reads the data of the track TR while gradually shortening the time interval in the first acceleration period PA1. The read processing unit 61*b* reads the data of the track TR while gradually increasing the time interval in the first deceleration period PD1.

Also in Modification 6, the same effects as those of the first embodiment can be obtained. Note that the period for executing the first read processing may further include a first uniform velocity period for seeking the read head RHD at a uniform velocity between the first acceleration period PA1 and the first deceleration period PD1. Also in this case, it is possible to reduce the risk of exciting the resonance frequency of the mechanism system.

Modification 7 of First Embodiment

Next, a configuration of a magnetic disk device 1 according to Modification 7 of the first embodiment will be described. FIG. 28 is a diagram showing changes in the read offset correction amount Xc to the position (radial position PXr) of the target sector SC by three types of graphs in Modification 7, and is a diagram showing an example in which the read start position is shifted in the circumferential direction three times and the read offset correction amounts Xc are changed in the same sinusoidal trajectory. The magnetic disk device 1 is configured similarly to the magnetic disk device 1 of Modification 6 except the configuration described in Modification 7.

As shown in FIG. 28, the technology of Modification 7 corresponds to a combination of the technology of Modification 1 (FIG. 21) and the technology of Modification 6 (FIG. 27). The read processing unit 61*b* performs the first read processing in the same manner as in Modification 6 (FIG. 27). In the first read processing, the read processing unit 61*b* first reads the data of the sector SC0 with the read offset correction amount Xc as Xcs (Xc[0]), and lastly reads the data of the sector SCNs−1 with the read offset correction amount Xc as Xce (Xc[k−1]).

From the profile of the bit error rate of the signal obtained by reading the data of the track TR by one cycle, it is possible to obtain Sopt1, which is the sector number S, and the first appropriate read offset correction amount Xcopt1, which is the read offset correction amount Xc when the bit error rate becomes smallest.

The read processing unit 61*b* sequentially executes a seek operation, a rotation waiting operation, and second read processing following the first read processing. The second read processing is the processing of seeking the read head RHD in the first seek direction within a period in which the disk DK rotates m2 times, similarly to the first read processing, moving the read head RHD to n2 radial positions PXr shifted from each other in the radial direction d1, and reading the data of the track TR at each radial position PXr. In Modification 7, the magnetic disk device 1 satisfies the relationship of the above formula 2 ($1 \leq m2 < n2$).

The operation of seeking the read head RHD during the second read processing is the same as the operation of seeking the read head RHD during the first read processing of Modification 6. In Modification 7, n1=n2 and m1=m2.

In the second read processing, the read processing unit 61b first reads the data of the sector SC{(2/3) (Ns−1)} with the read offset correction amount Xc as Xcs (Xc[0]), and lastly reads the data of the sector SC{(2/3) (Ns−1)−1} with the read offset correction amount Xc as Xce (Xc[k−1]).

The position (sector SC0) at which the data of the track TR is first read in the first read processing and the position (sector SC{(2/3) (Ns−1)}) at which the data of the track TR is first read in the second read processing are shifted from each other in the circumferential direction. As described above, it is shown that the read offset correction amount Xc is changed in the same sinusoidal trajectory in each of the first read processing and the second read processing.

The comparison unit 62 can further compare the qualities of a plurality of second signals obtained by the reading by the second read processing and derive the second signal of the highest quality from among the second signals.

The determination unit 63 can further determine the radial position PXr at the time of deriving the second signal of the highest quality among the n2 radial positions PXr as a second appropriate read position PXropt2a appropriate for reading the data of the track TR.

For example, from the profile of the bit error rate of the signal obtained by reading the data of the track TR by one cycle in the second read processing, the sector number Sopt2a and the second appropriate read offset correction amount Xcopt2a when the bit error rate becomes smallest can be obtained.

The read position averaging processing unit 64 can derive an averaging position that is a position obtained by averaging the first appropriate read position PXropt1 and the second appropriate read position PXropt2a in the radial direction d1. As a result, when reading the data of the track TR, the read processing unit 61b can move the read head RHD to the averaging position and read the data of the track TR at the averaging position. The read processing can be easily performed by positioning the read head RHD at an appropriate radial position PXr as compared with Modification 6, and a signal of higher quality can be easily obtained by the read processing.

The number of times of read processing for one track is not limited to two, and may be three or more. In Modification 7, the read processing including the first read processing and the second read processing is performed three times. In each of the read processing three times, the read offset correction amount Xc is changed on the same ease-in-out trajectory.

The read processing unit 61b sequentially executes a seek operation, a rotation waiting operation, and third read processing following the second read processing. The third read processing is similar to that of Modification 1 (FIG. 21) except the read offset correction amount Xc.

The comparison unit 62 can further compare the qualities of third signals obtained by the reading by the third read processing, and derive the third signal of the highest quality from among the third signals.

The determination unit 63 can further determine the radial position PXr at the time of deriving the third signal of the highest quality among the n radial positions PXr as a third appropriate read position PXropt2b appropriate for reading the data of the track TR.

For example, from the profile of the bit error rate of the signal obtained by reading the data of the track TR by one cycle in the third read processing, it is possible to obtain Sopt2b, which is the sector number S, and a third appropriate read offset correction amount Xcopt2b, which is the read offset correction amount Xc, when the bit error rate becomes smallest.

The read position averaging processing unit 64 can derive an averaging position that is a position obtained by averaging the first appropriate read position PXropt1, the second appropriate read position PXropt2a, and the third appropriate read position PXropt2b in the radial direction d1. The appropriate read offset correction amount Xcopt (the appropriate read position PXropt) from which the sector number dependency is removed can be obtained.

As a result, when reading the data of the track TR, the read processing unit 61b can move the read head RHD to the averaging position and read the data of the track TR at the averaging position.

Also in Modification 7, it is possible to obtain the same effects as those of Modification 1 and Modification 6.

Modification 8 of First Embodiment

Next, a configuration of a magnetic disk device 1 according to Modification 8 of the first embodiment will be described. FIG. 29 is a graph showing changes in the read offset correction amount Xc to the position (radial position PXr) of the target sector SC in Modification 8, and is a graph showing an example in which the read offset correction amount Xc is changed in a sinusoidal trajectory right-upward and then the read offset correction amount Xc is changed in a sinusoidal trajectory right-downward in a period in which the disk DK makes one rotation. The magnetic disk device 1 is configured similarly to the magnetic disk device 1 of Modification 6 except the configuration described in Modification 8.

As shown in FIG. 29, the technology of Modification 8 corresponds to a combination of the technology of Modification 3 (FIG. 24) and the technology of Modification 6 (FIG. 27). In the period Trot in which the disk DK makes one rotation, both the first read processing performed by seeking the read head RHD in the first seek direction ease-in-out and the second read processing performed by seeking the read head RHD in the second seek direction ease-in-out may be performed. The read head RHD is reciprocated between the radial position PXrs and the radial position PXre.

Specifically, the read processing unit 61b executes the second read processing after the first read processing. The second read processing is the processing of seeking the read head RHD in the second seek direction within a period in which the disk DK rotates m2 times, moving the read head RHD to n2 radial positions PXr shifted from each other in the radial direction d1, and reading the data of the track TR at each radial position PXr. In Modification 8, the magnetic disk device 1 satisfies the relationship of the above formula 2 ($1 \leq m2 < n2$). In Modification 8, n1=n2 and m1=m2.

The period during which the second read processing is executed includes a second acceleration period PA2, which is a first period and a second deceleration period PD2, which is a last period. The read processing unit 61b seeks the read head RHD while gradually increasing the speed in the second seek direction in the second acceleration period PA2. The read processing unit 61b seeks the read head RHD while gradually decreasing the speed in the second seek direction in the second deceleration period PD2.

In Modification 8, n2 radial positions PXr are provided at equal intervals in the radial direction d1. Therefore, the read processing unit 61b reads the data of the track TR while gradually shortening the time interval in the second acceleration period PA2. The read processing unit 61b reads the data of the track TR while gradually increasing the time interval in the second deceleration period PD2.

From the profile of the bit error rate of the signal obtained in the first read processing performed in the period in which the disk DK rotates ½ for the first time, the sector number Sopt1 and the first appropriate read offset correction amount Xcopt1 when the bit error rate becomes smallest can be obtained. From the profile of the bit error rate of the signal obtained in the second read processing performed during the remaining ½ rotation period of the disk DK, the sector number Sopt2a and the second appropriate read offset correction amount Xcopt2a when the bit error rate becomes smallest can be obtained.

Also in Modification 8, it is possible to obtain the same effects as those of Modification 3 and Modification 6. Note that the period for executing the second read processing may further include a second uniform velocity period for seeking the read head RHD at a uniform velocity between the second acceleration period PA2 and the second deceleration period PD2.

Second Embodiment

Next, a configuration of a magnetic disk device 1 according to a second embodiment will be described. FIG. 30 is graphs showing changes in a bit error rate ER, changes in a read offset correction amount Xc, and changes in a sector number at a target position in the case in which read processing, a seek operation, and a standby operation are repeatedly performed on a target track TR in the magnetic disk device 1 according to the second embodiment, and is a diagram showing an example in which the bit error rate ER is precisely measured in a second range narrower than a first range after the bit error rate ER is roughly measured in the first range. The magnetic disk device 1 is configured similarly to the magnetic disk device 1 of the first embodiment except the configuration described in the second embodiment.

As shown in FIG. 30, a read processing unit 61b performs first read processing within the first range similarly to the first embodiment (FIG. 17). In the first read processing, the read processing unit 61b first reads the data of a sector SC0 with a read offset correction amount Xc[i] as Xcs (Xc[0]), and lastly reads the data of a sector SCNs-1 with a read offset correction amount Xc[i] as Xce (Xc[k-1]). The first range is a range in a radial direction d1, is a range to which all of n1 radial positions PXr belong, and is a range from a radial position PXrs to a radial position PXre.

From the profile of the bit error rate of a signal obtained by reading the data of the track TR by one cycle, it is possible to obtain Sopt1, which is a sector number S, and a first appropriate read offset correction amount Xcopt1, which is the read offset correction amount Xc, when the bit error rate becomes smallest, and it is also possible to obtain a first appropriate read position PXropt1.

The first appropriate read offset correction amount Xcopt1 obtained in the first read processing is a coarse adjustment value, and the first appropriate read position PXropt1 is a coarse adjustment position. Therefore, as in the second embodiment, the appropriate read offset correction amount Xcopt, which is a more appropriate fine adjustment value than the first appropriate read offset correction amount Xcopt1, and the appropriate read position PXropt, which is a more appropriate fine adjustment position than the first appropriate read position PXropt1, may be further derived while satisfying the precondition for searching for an appropriate read position in a short time.

Therefore, the read processing unit 61b repeatedly executes a set of sequentially executing the seek operation, the rotation waiting operation, and the third read processing a plurality of times after the first read processing. The read processing unit 61b performs third read processing within the second range. The second range is a range to which the first appropriate read position PXropt1 belongs, a range which is narrower than the first range in the radial direction d1, and a range to which n3 radial positions PXr shifted from each other in the radial direction d1 belong.

In the second embodiment, the second range includes both sides of the first appropriate read position PXropt1. The n3 radial positions PXr in the second range include one or more radial positions PXr located on the outer OD side from the first appropriate read position PXropt1 and one or more radial positions PXr located on the inner ID side from the first appropriate read position PXropt1.

In the second embodiment, the n3 radial positions PXr are selected from n1 radial positions PXr. However, the n3 radial positions PXr are not necessarily selected from n1 radial positions PXr. In this case, for example, in the radial direction d1, the interval between the n3 radial positions PXr may be narrower than the interval between n1 radial positions PXr.

In each of the above sets, the read processing unit 61b executes the seek operation to move a read head RHD to one radial position PXr among the n3 radial positions PXr, executes the rotation waiting operation while keeping the read head RHD facing the one radial position PXr, and executes the third read processing of reading the data of the track TR a plurality of times at the one radial position PXr.

The signal quality averaging processing unit 65 can derive a plurality of averaging qualities. Each averaging quality is a quality obtained by averaging the qualities of a plurality of third signals obtained by a plurality of times of reading by the third read processing at one corresponding radial position PXr among the n3 radial positions PXr.

A comparison unit 62 can further compare the averaging qualities and derive the highest quality averaging quality from among the averaging qualities.

A determination unit 63 can further determine that the radial position PXr at the time of deriving the highest quality averaging quality among the n3 radial positions PXr is a third appropriate read position PXropt3 more appropriate for reading the data of the track TR than the first appropriate read position PXropt1.

As a result, when reading the data of the track TR, the read processing unit 61b can move the read head RHD to the third appropriate read position PXropt3 and read the data of the track TR at the third appropriate read position PXropt3.

Figure 31:
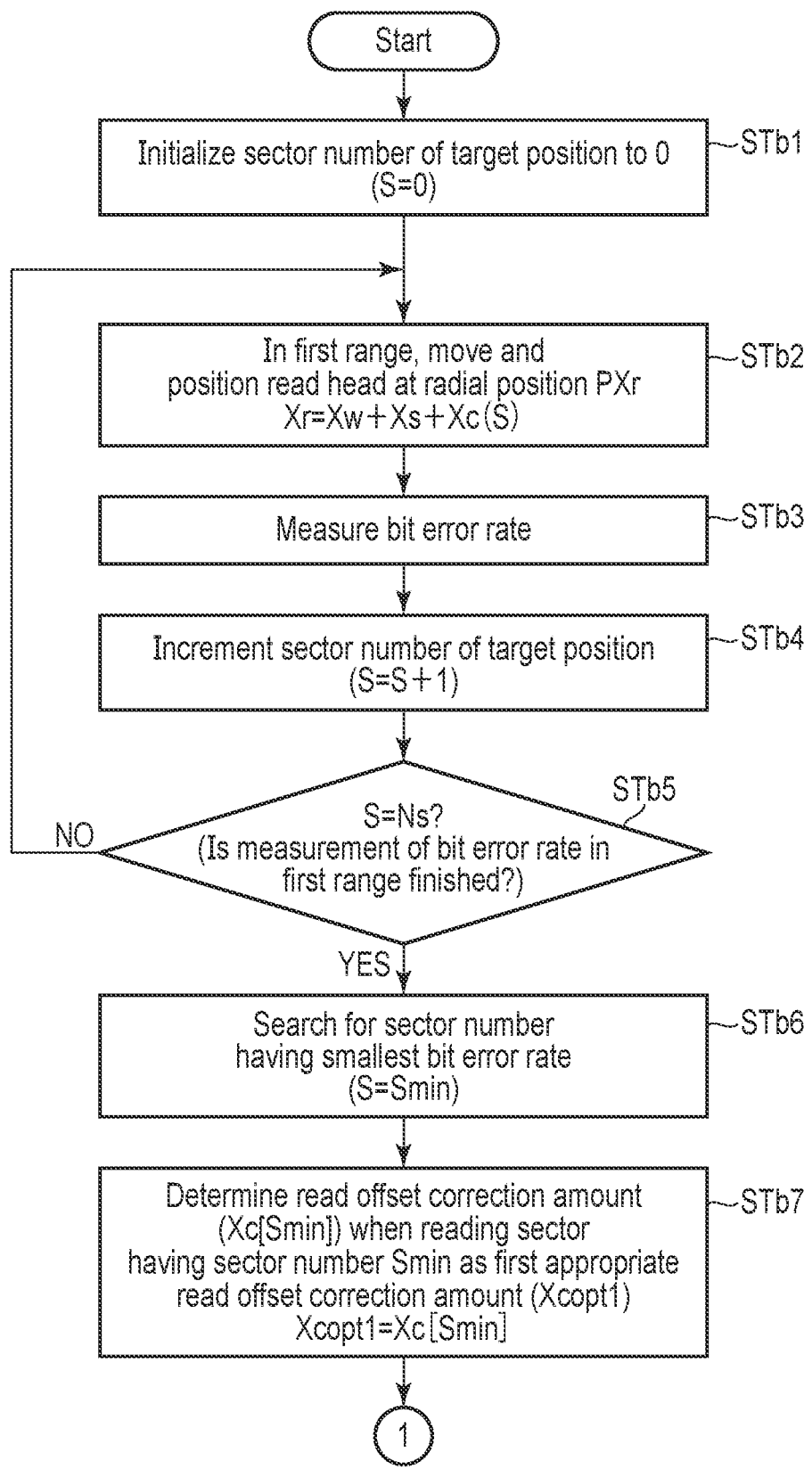
FIG. 31 is a flowchart that describes a method of searching for a third appropriate read offset correction amount applicable to the magnetic disk device of the second embodiment.
Figure 32:
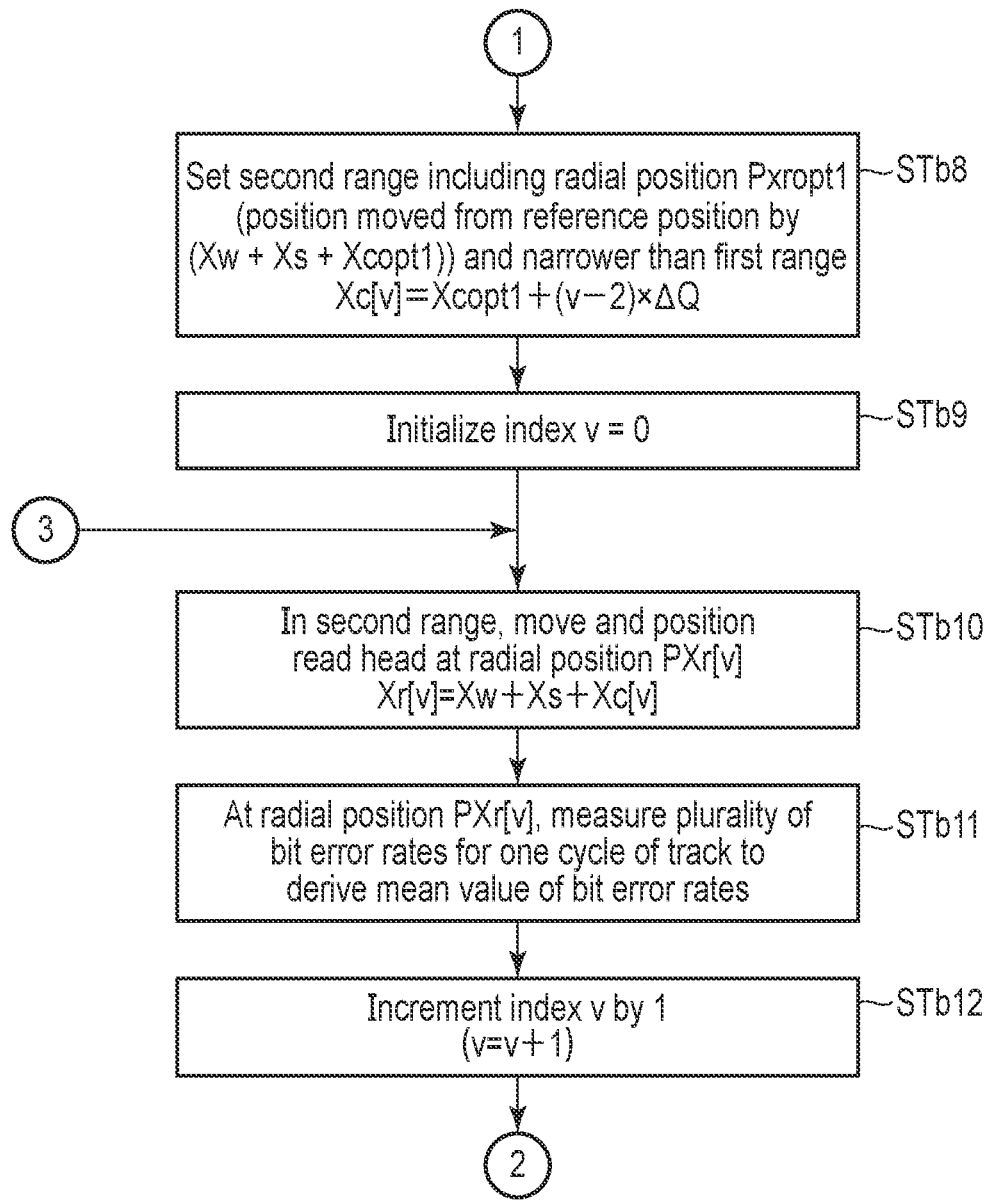
FIG. 32 is a flowchart that describes the method subsequent to FIG. 31.
Figure 33:
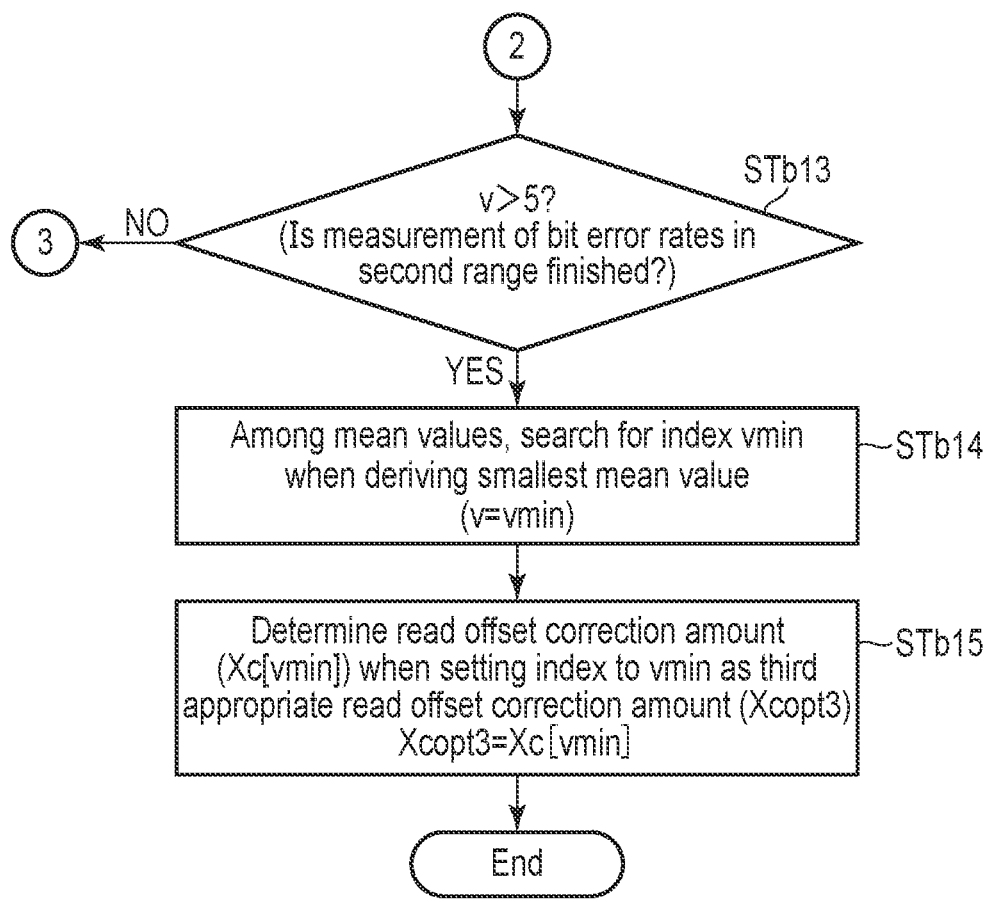
FIG. 33 is a flowchart that describes the method subsequent to FIG. 32.

FIG. 31 is a flowchart that describes a method of searching for the third appropriate read offset correction amount Xcopt3 applicable to the magnetic disk device 1 of the second embodiment. FIG. 32 is a flowchart that describes the above method subsequent to FIG. 31. FIG. 33 is a flowchart that describes the above method subsequent to FIG. 32.

As shown in FIG. 31, when the method of searching for the third appropriate read offset correction amount Xcopt3 for the track TR is started, first, in Step STb1, the read processing unit 61b initializes the sector number S of the target position to 0 (S=0).

Subsequently, in Step STb2, the read processing unit 61b moves and positions the read head RHD to the radial position PXr(S) within the first range, and then in Step STb3, the read channel 14R measures the bit error rate ER(S).

The radial position PXr(S) is a position apart from the reference position by a distance Xr(S) (Xr(S)=Xw+Xs+Xc (S)). The first range is a range having a width in the radial direction d1, ranging from the radial position PXrs to the radial position PXre.

After that, in Step STb4, the read processing unit 61b increments the sector number S at the target position. Subsequently, in Step STb5, the read processing unit 61b determines whether the sector number S at the target position exceeds the last sector number Ns−1. In the case in which the sector number S does not exceed the sector number Ns−1 (S≤Ns−1), the process proceeds to Step STb2, and the processes of steps STb2 to STb5 are repeatedly executed.

On the other hand, in the case in which it is determined in Step STb5 that the sector number S at the target position exceeds the sector number Ns−1 (S=Ns), the measurement of the bit error rate ER within the first range is finished, and the process proceeds to Step STb6. In Step STb6, the comparison unit 62 compares the bit error rates ER of the first signals obtained by the reading in the first read processing, and derives the first signal having the smallest (desirably minimum) bit error rate ER from among the first signals. Then, Smin, which is the sector number S when the first signal having the smallest bit error rate ER is derived, can be searched.

Subsequently, in Step STb7, the determination unit 63 determines the read offset correction amount Xc[Smin] when the sector SCmin having the sector number S of Smin is read as the first appropriate read offset correction amount Xcopt1 (Xcopt1=Xc[Smin]).

As shown in FIG. 32, subsequently in Step STb8, the read processing unit 61b sets the second range narrower than the first range. The second range includes the radial position PXropt1 which is the first appropriate read position PXropt1. The radial position PXropt1 is a position moved from the reference position by (Xw+Xs+Xcopt1). The read offset correction amount Xc when the third read processing is executed within the second range is Xc[v]. For example, the read processing unit 61b can set the read offset correction amounts Xc[0], Xc[1], Xc[2], Xc[3], and Xc[4] at the five radial positions PXr using Formula 3 (n3=5) below.

$$Xc[v]=Xcopt1+(v-2)\times \Delta Q \qquad \text{Formula 3}$$

Here, the step size of the read offset correction amount Xc is ΔQ. After that, in Step STb9, the read processing unit 61b initializes an index v to 0 (v=0).

Subsequently, in Step STb10, the read processing unit 61b moves the read head RHD to the radial position PXr[v] within the second range and positions the read head RHD. Subsequently, in Step STb11, the read channel 14R measures a plurality of bit error rates ER[v] for one cycle of the track TR1 at the radial position PXr[v], and the signal quality averaging processing unit 65 derives a mean value of the plurality of bit error rates ER[v].

After that, in Step STb12, the read processing unit 61b increments the index v. Subsequently, in Step STb13, the read processing unit 61b determines whether the index v exceeds the set value 5. In the case in which the index v does not exceed 5 (v<5), the process proceeds to Step STb10, and the processes of steps STb10 to STb13 are repeatedly executed.

On the other hand, in the case in which it is determined in Step STb13 that the index v exceeds 5 (set value) (v=5), the measurement of the bit error rate ER within the second range is finished, and the process proceeds to Step STb14. In Step STb14, the comparison unit 62 compares a plurality of mean values obtained in the reading by the third read processing, and derives a mean value having the smallest (desirably minimum) bit error rate ER from among the plurality of mean values. Then, vmin, which is the index v when the smallest mean value is derived, can be searched.

The determination unit 63 can determine the read offset correction amount Xc[vmin] when the index v is set to vmin as the third appropriate read offset correction amount Xcopt3. Accordingly, the method of searching for the third appropriate read offset correction amount Xcopt3 for the track TR is ended.

According to the magnetic disk device 1 and the method of searching for the third appropriate read position PXropt3 according to the second embodiment thus configured, the second embodiment is possible to obtain the same effects as those of the first embodiment. After the first appropriate read position PXropt1 (the first appropriate read offset correction amount Xcopt1) is derived by roughly measuring the wide first range, it is possible to derive the third appropriate read position PXropt3 (the third appropriate read offset correction amount Xcopt3) by precisely measuring only the second range that is narrower.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Two or more of the embodiments and the modifications can be combined as necessary.

What is claimed is:

1. A magnetic disk device comprising:
   a disk having a track in a recording layer;
   a read head that reads data from the recording layer of the disk; and
   a control unit including:
   a read processing unit that executes first read processing of moving the read head to n1 radial positions shifted from each other in a radial direction of the disk within a period in which the disk makes m1 rotations and reading the data of the track at each of the radial positions;
   a comparison unit that compares qualities of a plurality of first signals obtained by reading in the first read processing and derives a first signal of highest quality from among the first signals; and
   a determination unit that determines, among n1 radial positions, a radial position at which the first signal of the highest quality is derived as a first appropriate read position appropriate for reading the data of the track, where 1≤m1<n1.

2. The magnetic disk device according to claim 1, wherein when the data of the track is read, the read processing unit moves the read head to the first appropriate read position and reads the data of the track at the first appropriate read position.

3. The magnetic disk device according to claim 1, further comprising
a read channel that measures quality of the first signals obtained by reading in the first read processing.

4. The magnetic disk device according to claim 1, wherein quality of the first signals is an amplitude of the first signals, and
the first signal of the highest quality is a signal having a largest amplitude among the first signals.

5. The magnetic disk device according to claim 4, wherein the first signal of the highest quality is a signal having a maximum amplitude among the first signals.

6. The magnetic disk device according to claim 1, wherein quality of the first signals is a bit error rate of the first signals, and
the first signal of the highest quality is a signal having a smallest bit error rate among the first signals.

7. The magnetic disk device according to claim 6, wherein the first signal of the highest quality is a signal having a minimum bit error rate among the first signals.

8. The magnetic disk device according to claim 1, wherein when the first read processing is executed,
the read processing unit seeks the read head in a first seek direction at a uniform velocity.

9. The magnetic disk device according to claim 8, wherein n1 radial positions are provided at equal intervals in the radial direction, and
when the first read processing is executed,
the read processing unit reads the data of the track at regular time intervals.

10. The magnetic disk device according to claim 8, wherein
the read processing unit sequentially executes a seek operation, a rotation waiting operation, and second read processing following the first read processing,
the second read processing is processing of seeking the read head in the first seek direction, moving the read head to n2 radial positions shifted from each other in the radial direction, and reading the data of the track at each of the radial positions in a period in which the disk rotates m2 times,
where 1≤m2<n2,
the operation of seeking the read head during the second read processing is equal to the operation of seeking the read head during the first read processing, and
a position at which the data of the track is first read in the first read processing and a position at which the data of the track is first read in the second read processing are shifted from each other in a circumferential direction of the disk.

11. The magnetic disk device according to claim 10, wherein
the control unit further includes a read position averaging processing unit,
the comparison unit further compares qualities of a plurality of second signals obtained by reading in the second read processing, and derives a second signal of highest quality from among the second signals,
the determination unit further determines a radial position at which the second signal of the highest quality is derived among the n2 radial positions as a second appropriate read position appropriate for reading the data of the track,
the read position averaging processing unit derives an averaging position that is a position obtained by averaging the first appropriate read position and the second appropriate read position in the radial direction, and
when the data of the track is read, the read processing unit moves the read head to the averaging position and reads the data of the track at the averaging position.

12. The magnetic disk device according to claim 8, wherein
the read processing unit executes second read processing after the first read processing, and
the second read processing is processing of seeking the read head in a second seek direction opposite to the first seek direction at a uniform velocity, moving the read head to n2 radial positions shifted from each other in the radial direction, and reading the data of the track at each of the radial positions in a period in which the disk rotates m2 times,
where 1≤m2<n2.

13. The magnetic disk device according to claim 12, wherein
a radial position at which the data of the track is read last in the first read processing and a radial position at which the data of the track is read first in the second read processing are matched, and
a radial position at which the data of the track is read first in the first read processing and a radial position at which the data of the track is read last in the second read processing are matched.

14. The magnetic disk device according to claim 1, wherein
a period during which the first read processing is executed includes a first acceleration period that is a first period and a first deceleration period that is a last period, and
the read processing unit
seeks the read head while gradually increasing the speed in a first seek direction in the first acceleration period, and
seeks the read head while gradually decreasing the speed in the first seek direction in the first deceleration period.

15. The magnetic disk device according to claim 14, wherein
n1 radial positions are provided at equal intervals in the radial direction, and
the read processing unit
reads the data of the track while gradually shortening a time interval in the first acceleration period, and
reads the data of the track while gradually increasing the time interval in the first deceleration period.

16. The magnetic disk device according to claim 14, wherein
the read processing unit sequentially executes a seek operation, a rotation waiting operation, and second read processing following the first read processing,
the second read processing is processing of seeking the read head in the first seek direction, moving the read head to n2 radial positions shifted from each other in the radial direction, and reading the data of the track at each of the radial positions in a period in which the disk rotates m2 times,
where 1≤m2<n2,
the operation of seeking the read head during the second read processing is equal to the operation of seeking the read head during the first read processing, and a position at which the data of the track is first read in the first read processing and a position at which the data of the track is first read in the second read processing are shifted from each other in a circumferential direction of the disk.

17. The magnetic disk device according to claim 14, wherein
the read processing unit executes second read processing after the first read processing,
the second read processing is processing of seeking the read head in a second seek direction opposite to the first seek direction, moving the read head to n2 radial positions shifted from each other in the radial direction, and reading the data of the track at each of the radial positions in a period in which the disk rotates m2 times, where $1 \leq m2 < n2$,
a period during which the second read processing is executed includes a second acceleration period which is a first period and a second deceleration period which is a last period, and
the read processing unit
seeks the read head while gradually increasing the speed in the second seek direction in the second acceleration period, and
seeks the read head while gradually decreasing the speed in the second seek direction in the second deceleration period.

18. The magnetic disk device according to claim 1, wherein
the control unit further includes a signal quality averaging processing unit,
when a first range is defined as a range in the radial direction and to which all of n1 radial positions belong, and
a second range is defined as a range to which the first appropriate read position belongs, which is narrower than the first range in the radial direction, and to which n3 radial positions shifted from each other in the radial direction belong,
the read processing unit repeatedly executes a set of sequentially executing a seek operation, a rotation waiting operation, and third read processing a plurality of times after the first read processing, and
in each of the sets, the read processing unit
executes the seek operation to move the read head to a radial position among the n3 radial positions,
executes the rotation waiting operation while the read head is held in a state of facing the radial position, and
executes the third read processing of reading the data of the track a plurality of times at the radial position,
the signal quality averaging processing unit derives a plurality of averaging qualities,
each of the averaging qualities is a quality obtained by averaging qualities of a plurality of third signals obtained by a plurality of times of reading by the third read processing at a corresponding radial position among the n3 radial positions,
the comparison unit further compares the averaging qualities to derive a highest quality averaging quality from among the averaging qualities,
the determination unit further determines a radial position when the highest quality averaging quality is derived among the n3 radial positions as a third appropriate read position more appropriate for reading the data of the track than the first appropriate read position, and
when the data of the track is read, the read processing unit moves the read head to the third appropriate read position and reads the data of the track at the third appropriate read position.

19. The magnetic disk device according to claim 18, wherein
the n3 radial positions of the second range include
one or more radial positions located on an outer circumferential side of the first appropriate read position, and
one or more radial positions located on an inner circumferential side of the first appropriate read position.

20. The magnetic disk device according to claim 1, further comprising:
a write head that writes data in the recording layer of the disk; and
an arm supporting the read head and the write head,
the control unit further including
a write processing unit that executes write processing of moving the read head to a standby position and writing data to the track,
when the first appropriate read position is a position offset from the standby position and the data of the track is read, the read processing unit moving the read head to the first appropriate read position offset from the standby position and reading the data of the track at the first appropriate read position,
when the first appropriate read position matches the standby position and the data of the track is read, the read processing unit moving the read head to the first appropriate read position which is the standby position and reading the data of the track at the first appropriate read position.

* * * * *